US009766409B2

(12) United States Patent
Pelley et al.

(10) Patent No.: US 9,766,409 B2
(45) Date of Patent: Sep. 19, 2017

(54) OPTICAL REDUNDANCY

(71) Applicant: Freescale Semiconductor, Inc., Austin, TX (US)

(72) Inventors: Perry H. Pelley, Austin, TX (US); Tab A. Stephens, Austin, TX (US); Michael B. McShane, Austin, TX (US)

(73) Assignee: NXP USA, INC., Austin, TX (US)

( * ) Notice: Subject to any disclaimer, the term of this patent is extended or adjusted under 35 U.S.C. 154(b) by 392 days.

(21) Appl. No.: 13/914,149

(22) Filed: Jun. 10, 2013

(65) Prior Publication Data

US 2014/0363124 A1    Dec. 11, 2014

(51) Int. Cl.
*G02B 6/26* (2006.01)
*G02B 6/42* (2006.01)
*G02B 6/35* (2006.01)
*G02B 26/08* (2006.01)

(52) U.S. Cl.
CPC ......... *G02B 6/3502* (2013.01); *G02B 6/3562* (2013.01); *G02B 6/3596* (2013.01); *G02B 6/357* (2013.01); *G02B 26/0833* (2013.01)

(58) Field of Classification Search
CPC .. G02B 6/3502; G02B 6/3562; G02B 6/3596; G02B 6/357; G02B 26/0833
USPC ......................................................... 385/16
See application file for complete search history.

(56) References Cited

U.S. PATENT DOCUMENTS

| | | | |
|---|---|---|---|
| 4,130,342 A | 12/1978 | McMahon | |
| 4,548,467 A * | 10/1985 | Stoerk | G02B 6/3825 385/65 |
| 4,653,850 A | 3/1987 | Boirat et al. | |
| 4,828,358 A | 5/1989 | Blonder | |
| 5,020,871 A | 6/1991 | Nishimura | |
| 5,321,498 A | 6/1994 | Song et al. | |
| 5,371,817 A * | 12/1994 | Revelli, Jr. | B41J 2/45 385/16 |
| 5,483,174 A | 1/1996 | Hembree et al. | |
| 5,534,784 A | 7/1996 | Lum et al. | |
| 5,631,571 A | 5/1997 | Spaziani et al. | |

(Continued)

FOREIGN PATENT DOCUMENTS

EP    1172680 A2    1/2002
WO    2006136194 A1   12/2006

OTHER PUBLICATIONS

Shen, Po-Kuan, et al., "SOI-based trapezoidal waveguide with 45-degree microreflector for non-coplanar light bending", Silicon Phototonics VII, Proceedings of SPIE, vol. 8266, Feb. 9, 2012, pp. 1-7.

(Continued)

*Primary Examiner* — Jerry Blevins

(57) ABSTRACT

A high density, low power, high performance information system, method and apparatus are described in which an integrated circuit apparatus includes a first integrated circuit link element (657) and a redundant integrated circuit link element (660) connected in parallel between first and second deflectable MEMS switches (652-655, 662-665) which are connected in a signal path and controlled to deselect the first integrated circuit link element (657) and connect the redundant integrated circuit link element (660) in the signal path in response to a two-state control signal provided to the first and second deflectable MEMs switches which identifies the first integrated circuit link element as being defective.

16 Claims, 19 Drawing Sheets

(56) References Cited

U.S. PATENT DOCUMENTS

| | | | |
|---|---|---|---|
| 5,963,554 A | 10/1999 | Song | |
| 6,055,342 A | 4/2000 | Yi et al. | |
| 6,325,553 B1 | 12/2001 | Deacon et al. | |
| 6,335,224 B1 | 1/2002 | Peterson et al. | |
| 6,417,107 B1 | 7/2002 | Sekimura | |
| 6,477,303 B1 | 11/2002 | Witherspoon | |
| 6,556,285 B1 | 4/2003 | Dickson | |
| 6,650,810 B1 | 11/2003 | Lieberman et al. | |
| 6,686,993 B1 | 2/2004 | Karpman et al. | |
| 6,690,845 B1 | 2/2004 | Yoshimura et al. | |
| 6,753,037 B2 | 6/2004 | Miller et al. | |
| 6,765,396 B2 | 7/2004 | Barror | |
| 6,810,165 B2 | 10/2004 | Golub et al. | |
| 6,813,584 B2 | 11/2004 | Zhou et al. | |
| 6,850,081 B1 | 2/2005 | Birdsley et al. | |
| 6,865,311 B2 * | 3/2005 | Li | H04B 10/25133 385/17 |
| 6,897,663 B1 | 5/2005 | Conn | |
| 6,909,830 B2 | 6/2005 | Lee et al. | |
| 6,936,491 B2 | 8/2005 | Partridge et al. | |
| 6,950,570 B1 | 9/2005 | Novotny | |
| 6,999,651 B2 | 2/2006 | Qian et al. | |
| 7,016,564 B1 | 3/2006 | Graves | |
| 7,020,363 B2 | 3/2006 | Johannessen | |
| 7,042,563 B2 | 5/2006 | Wilsher et al. | |
| 7,071,025 B2 | 7/2006 | Brenner et al. | |
| 7,183,759 B1 | 2/2007 | Malendevich et al. | |
| 7,215,845 B1 | 5/2007 | Chan et al. | |
| 7,224,174 B1 | 5/2007 | Malendevich et al. | |
| 7,271,461 B2 | 9/2007 | Dutta | |
| 7,298,536 B2 | 11/2007 | McCann et al. | |
| 7,379,191 B2 | 5/2008 | Brooks | |
| 7,427,868 B2 | 9/2008 | Strid et al. | |
| 7,440,449 B2 | 10/2008 | Carson et al. | |
| 7,444,042 B1 | 10/2008 | Niblock et al. | |
| 7,450,812 B2 | 11/2008 | Romo et al. | |
| 7,474,420 B2 | 1/2009 | Li et al. | |
| 7,532,785 B1 | 5/2009 | Beausoleil et al. | |
| 7,555,333 B2 | 6/2009 | Wang et al. | |
| 7,586,608 B1 | 9/2009 | Gunn, III et al. | |
| 7,587,106 B2 | 9/2009 | Piede et al. | |
| 7,612,737 B2 | 11/2009 | Bright et al. | |
| 7,630,603 B2 | 12/2009 | Wu et al. | |
| 7,664,349 B2 | 2/2010 | Holmstrom et al. | |
| 7,824,945 B2 | 11/2010 | Chang et al. | |
| RE42,124 E | 2/2011 | Riza | |
| 7,982,765 B2 | 7/2011 | Lewis et al. | |
| 8,004,080 B2 | 8/2011 | McShane et al. | |
| 8,014,682 B2 | 9/2011 | Pelley et al. | |
| 8,032,030 B2 | 10/2011 | Pessoa et al. | |
| 8,058,137 B1 | 11/2011 | Or-Bach et al. | |
| 8,064,739 B2 | 11/2011 | Binkert et al. | |
| 8,218,917 B2 | 7/2012 | Sano et al. | |
| 8,260,151 B2 | 9/2012 | Pelley et al. | |
| 8,319,230 B1 | 11/2012 | Dutta | |
| 8,442,368 B1 | 5/2013 | Reano et al. | |
| 8,749,772 B2 | 6/2014 | Busico et al. | |
| 8,750,660 B2 | 6/2014 | Levy et al. | |
| 8,766,284 B1 | 7/2014 | Dutta | |
| 8,859,394 B2 | 10/2014 | Dallesasse et al. | |
| 8,916,874 B2 | 12/2014 | Whitbread et al. | |
| 9,091,820 B2 | 7/2015 | Stephens et al. | |
| 9,094,135 B2 | 7/2015 | Pelley et al. | |
| 2002/0012744 A1 | 1/2002 | Miller et al. | |
| 2002/0028045 A1 | 3/2002 | Yoshimura et al. | |
| 2002/0132389 A1 | 9/2002 | Patel et al. | |
| 2003/0017640 A1 | 1/2003 | Barenburg et al. | |
| 2003/0026517 A1 | 2/2003 | Shimoda | |
| 2003/0043289 A1 | 3/2003 | Konno | |
| 2003/0161573 A1 | 8/2003 | Ishida et al. | |
| 2003/0199109 A1 | 10/2003 | Kuzma | |
| 2004/0013359 A1 | 1/2004 | Lee et al. | |
| 2004/0027644 A1 | 2/2004 | Fazi, Jr. | |
| 2004/0036170 A1 | 2/2004 | Lee et al. | |
| 2004/0071387 A1 | 4/2004 | Mule et al. | |
| 2004/0081402 A1 | 4/2004 | Ouchi | |
| 2004/0122328 A1 | 6/2004 | Wang et al. | |
| 2004/0245586 A1 | 12/2004 | Partridge et al. | |
| 2004/0248344 A1 | 12/2004 | Partridge et al. | |
| 2005/0025414 A1 | 2/2005 | Kamiyama et al. | |
| 2005/0058128 A1 | 3/2005 | Carson et al. | |
| 2005/0069253 A1 | 3/2005 | Heideman | |
| 2005/0141808 A1 | 6/2005 | Cheben et al. | |
| 2005/0224946 A1 | 10/2005 | Dutta | |
| 2006/0049826 A1 * | 3/2006 | Daneman | G02B 6/3518 324/207.13 |
| 2007/0048898 A1 | 3/2007 | Carlson et al. | |
| 2007/0242919 A1 * | 10/2007 | Welch | B82Y 20/00 385/14 |
| 2008/0080809 A1 | 4/2008 | Kushiyama et al. | |
| 2008/0181557 A1 | 7/2008 | Wang et al. | |
| 2008/0246106 A1 | 10/2008 | Beausoleil et al. | |
| 2009/0263138 A1 | 10/2009 | Pelley et al. | |
| 2009/0263143 A1 | 10/2009 | Pelley et al. | |
| 2009/0311819 A1 | 12/2009 | Chang et al. | |
| 2010/0236909 A1 * | 9/2010 | Biedrzycki | G02B 6/0001 200/310 |
| 2011/0057306 A1 | 3/2011 | McShane et al. | |
| 2011/0091157 A1 | 4/2011 | Yao et al. | |
| 2011/0317958 A1 | 12/2011 | Nadeau et al. | |
| 2012/0051695 A1 | 3/2012 | Harada et al. | |
| 2012/0058616 A1 | 3/2012 | Ahn et al. | |
| 2012/0104389 A1 | 5/2012 | Whitbread et al. | |
| 2012/0129301 A1 | 5/2012 | Or-Bach et al. | |
| 2012/0183009 A1 | 7/2012 | Adachi et al. | |
| 2012/0324156 A1 | 12/2012 | Muralimanohar et al. | |
| 2013/0039614 A1 | 2/2013 | Shubin et al. | |
| 2013/0272337 A1 | 10/2013 | Tan et al. | |
| 2014/0064659 A1 | 3/2014 | Doerr et al. | |
| 2014/0362425 A1 | 12/2014 | Stephens et al. | |
| 2014/0363119 A1 | 12/2014 | Stephens et al. | |
| 2014/0363120 A1 | 12/2014 | Stephens et al. | |
| 2014/0363124 A1 | 12/2014 | Pelley et al. | |
| 2014/0363153 A1 | 12/2014 | McShane et al. | |
| 2014/0363172 A1 | 12/2014 | Pelley et al. | |
| 2014/0363905 A1 | 12/2014 | McShane et al. | |
| 2015/0253511 A1 | 9/2015 | Pelley | |
| 2016/0011438 A1 * | 1/2016 | Reano | G02F 1/0147 385/2 |

OTHER PUBLICATIONS

Civitci, F., et al., "Light Turning Mirrors for Hybrid Integration of Optical Waveguides in SiON Technology and CMOS based Photodetectors", Lasers and Electro-Optics Europe (CLEO EUROPE/EQEC), 2011 Conference on and 12th European Quantum Electronics Conference, Munich, May 22-26, 2011, 1 page.

Wang, Wei-Chih et al., Development of an Optical Waveguide Cantilever Scanner, Proceedings of SPIE, vol. 4876, 2003.

Ollier, Eric, Optical MEMS Devices Based on Moving Waveguides, IEEE Journal on Selected Topics in Quantum Electronics, vol. 8, No. 1, Jan./Feb. 2002.

Baets, R. et al., Silicon Photonics, IEEE 2007.

Bisaillon, E. et al., Free-Space Optical Link with Spatial Redundancy for Misalignment Tolerance, IEEE Photonics Technology Letters, vol. 14, No. 2, Feb. 2002.

Bowers, John E. et al., Hybrid Silicon Evanescent Laser on a Silicon-on-Insulator Waveguide, 2006.

Siebel, U. et al., Crosstalk-Enhanced Polymer Digital Optical Switch Based on a W-Shape, IEEE Photonics Technology Letters, vol. 12, No. 1, Jan. 2000.

Paniccia, Mario, Intel Corporation, First Electrically Pumped Hybrid Silicon Laser, UCSB Engineering Insights, Oct. 18, 2006.

Paniccia, Mario, Intel Corporation, First Electrically Pumped Hybrid Silicon Laser, UCSB Engineering Insights, http://www.intel.com/content/dam/www/public/us/en/documents/technology-briefs/intel-labs-hybrid-silicon-laser-announcement.pdf, Sep. 18, 2006.

Samara-Rubio, Dean et al., Customized Drive Electronics to Extend Silicon Optical Modulators to 4 Gb/s, IEEE Journal of Lightwave Technology, vol. 23, No. 12, Dec. 2005.

(56) References Cited

OTHER PUBLICATIONS

Johnson, R. Colin, Intel demos 40-Gbit/s Silicon Laser, Aug. 22, 2007.
RP Phototonics, Beam Splitters, http://www.rp-phototonics.com/beam_splitters.html, printed May 13, 2013.
Computer weekly.com, IBM debuts prototype terabit optical chip "Holey Optochip," http://www.computerweekly.com/news/2240146552/IBM-unveils-prototype-terabit-optcal-chip, Mar. 8, 2012.
A.N. Udipi et al., Combining Memory and a Controller with Photonics through 3D-Stacking to Enable Scalable and Energy-Efficient Systems, ISCA Jun. 4-8, 2011 http://www.cs.utah.edu/~rajeev/pubs/isca11.pdf.
D. Vantrease et al., Corona: System Implications of Emerging Nanophotonic Technology, ISCA '08 Proceedings of the 35th Annual International Symposium on Computer Architecture, pp. 153-164 http://pages.cs.wisc.edu/~danav/pubs/papers/isca08_corona.pd.
R. Goodwins, Inside Intel's 50 Gbps silicon optics, Jul. 27, 2010, printed Mar. 21, 2013 http://www.zdnet.com/inside-intels-50gbps-silicon-optics-3040089657/.
P. Ramm et al., Through Silicon Via Technology—Process and Reliability for Wafer-Level 3D System Integration, IEEE 2008 Electronic Components and Technology Conference, pp. 841-846.
M. Lapedus, Semiconductor Manufacturing & Design Community, Options and Hurdles Come into Focus for 3D Stacking, http://semimd.com/blog/2012/05/29/6210/, printed May 13, 2013.
C. Strandman et al., Fabrication of 45-degree Mirrors Together with Well-Defined V-Grooves Using Wet Anisotropic Etching of Silicon, IEEE Journal of Microelectromechanical Systems, vol. 4, No. 4, Dec. 1995.
M. Immonen et al., Fabrication and Characterization of Polymer Optical Waveguides with Integrated Micromirrors for Three-Dimensional Board-Level Optical Interconnects, IEEE Transactions on Electronics Packaging Manufacturing, vol. 28, No. 4, Oct. 2005.
K-W Lee et al., 3D Heterogeneous Opto-Electronic Integration Technology for System-on-Silicon (SOS), 2009 IEEE International Electron Devices Meeting (IEDM), Dec. 7-9, 2009.
J. Brouckaert et al., Thin-Film III-V Photodetectors Integrated on Silicon-on-Insulator Photonic ICs, IEEE Journal of Lightwave Technology, vol. 25, No. 4, Apr. 2007.
RP Photonics, Dielectric Coatings, http://www.rp-phototonics.com/dielectric_coatings.html, printed Apr. 16, 2013.
RP Photonics, Dielectric Mirrors, http://www.rp-phototonics.com/dielectric_mirrors.html, printed Apr. 16, 2013.
Notice of Allowance received Feb. 11, 2016 in U.S. Appl. No. 13/914,123.
Final office action received Mar. 29, 2016 in U.S. Appl. No. 13/914,178.
Non-final office action received Apr. 7, 2016 in U.S. Appl. No. 13/914,199.
Noriki, A., et al, "Through Silicon Photonic Via (TSPV) with Si Core for Low Loss and High-Speed Data Transmission in Opto-Electronic 3-D LSI", 3D Systems Integration Conference (3DIC), 2010 IEEE International, Nov. 16-18, 2010.
Restriction Requirement dated Dec. 18, 2014 in U.S. Appl. No. 13/914,089.
Non-final office action dated Sep. 25, 2015 in U.S. Appl. No. 13/914,149.
Final office action dated Feb. 17, 2016 in U.S. Appl. No. 13/914,149.
Restriction Requirement dated Dec. 18, 2014 in U.S. Appl. No. 13/914,178.
Restriction Requirement dated Nov. 13, 2014 in U.S. Appl. No. 13/914,049.
Restriction Requirement dated Sep. 9, 2014 in U.S. Appl. No. 13/913,993.
Extended European Search Report dated Oct. 13, 2014 in EP Application No. 14170945.1.
Hauffe, R., et al., "Crosstalk-Optimized Integrated Optical Switching Matrices in Polymers by Use of Redundant Switch Elements", IEEE Photonics Technology Letters, vol. 13, No. 3, Mar. 2001.
Non-final office action dated Feb. 2, 2015 in U.S. Appl. No. 13/914,049.
Non-final office action dated Feb. 25, 2015 in U.S. Appl. No. 13/913,993.
Non-final office action dated Mar. 4, 2015 in U.S. Appl. No. 13/914,178.
Notice of Allowance dated Apr. 14, 2015 in U.S. Appl. No. 13/914,021.
Notice of Allowance dated May 11, 2015 in U.S. Appl. No. 13/914,049.
Non-final office action dated Jun. 3, 2015 in U.S. Appl. No. 13/914,089.
Non-final office action dated Jun. 5, 2015 in U.S. Appl. No. 13/914,199.
Final office action dated Aug. 21, 2015 in U.S. Appl. No. 13/913,993.
Non-final office action dated Sep. 17, 2015 in U.S. Appl. No. 13/914,123.
Non-final office action dated Sep. 21, 2015 in U.S. Appl. No. 13/914,178.
Notice of Allowance dated Nov. 23, 2015 in U.S. Appl. No. 13/913,993.
Final office action dated Dec. 2, 2015 in U.S. Appl. No. 13/914,199.
Final office action dated Dec. 11, 2015 in U.S. Appl. No. 13/914,089.
Notice of Allowance dated Feb. 11, 2016 in U.S. Appl. No. 13/914,123.
Final office action dated Mar. 29, 2016 in U.S. Appl. No. 13/914,178.
Non-final office action dated Apr. 7, 2016 in U.S. Appl. No. 13/914,199.
Notice of Allowance dated May 12, 2016 in U.S. Appl. No. 13/914,123.
Non-final office action dated Jun. 6, 2016 in U.S. Appl. No. 13/914,178.
Notice of Allowance dated Aug. 1, 2016 in U.S. Appl. No. 13/914,089.
Final office action dated Oct. 3, 2016 in U.S. Appl. No. 13/914,199.
Final office action dated Dec. 30, 2016 in U.S. Appl. No. 13/914,178.
Non-final office action dated Jan. 5, 2017 in U.S. Appl. No. 13/914,199.
Non-final office action dated Jul. 21, 2017 in U.S. Appl. No. 13/914,199.

* cited by examiner

OPTICAL REDUNDANCY

CROSS-REFERENCE TO RELATED APPLICATIONS

U.S. patent application Ser. No. 13/913,993, entitled "Optical Wafer and Die Probe Testing," by inventors Michael B. McShane, Perry H. Pelley, and Tab A. Stephens, filed Jun. 10, 2013, describes exemplary methods and systems and is incorporated by reference in its entirety.

U.S. patent application Ser. No. 13/914,021 entitled "Die Stack with Optical TSVS," by inventors Perry H. Pelley, Tab A. Stephens, and Michael B. McShane, filed Jun. 10, 2013, describes exemplary methods and systems and is incorporated by reference in its entirety.

U.S. patent application Ser. No. 13/914,049, entitled "Communication System Die Stack," by inventors Tab A. Stephens, Perry H. Pelley, and Michael B. McShane, filed Jun. 10, 2013, describes exemplary methods and systems and is incorporated by reference in its entirety.

U.S. patent application Ser. No. 13/914,089, entitled "Integration of a MEMS Beam with Optical Waveguide and Deflection in Two Dimensions," by inventors Tab A. Stephens, Perry H. Pelley, and Michael B. McShane, filed Jun. 10, 2013, describes exemplary methods and systems and is incorporated by reference in its entirety.

U.S. patent application Ser. No. 13/914,123, entitled "Method and Apparatus for Beam Control with Optical MEMS Beam Waveguide," by inventor Perry H. Pelley, filed Jun. 10, 2013, describes exemplary methods and systems and is incorporated by reference in its entirety.

U.S. patent application Ser. No. 13/914,178, entitled "Optical Backplane Mirror," by inventors Tab A. Stephens, Perry H. Pelley, and Michael B. McShane, filed Jun. 10, 2013, describes exemplary methods and systems and is incorporated by reference in its entirety.

U.S. patent application Ser. No. 13/914,199, entitled "Optical Die Test Interface," by inventors Michael B. McShane, Perry H. Pelley, and Tab A. Stephens, filed on Jun. 10, 2013, describes exemplary methods and systems and is incorporated by reference in its entirety.

BACKGROUND OF THE INVENTION

Field of the Invention

The present invention is directed in general to semiconductor devices and methods for manufacturing same. In one aspect, the present invention relates to the fabrication of semiconductor devices or integrated circuits with optical micro-electro-mechanical systems (MEMS) circuits and devices.

Description of the Related Art

In information systems, data signal information is communicated between devices and circuits using different types of signal connections. With electrical conductor-based connections, such as conventional wires or through silicon vias (TSVs), there are power and bandwidth constraints imposed by the power requirements and physical limitations of such conductor-based connections. For example, stacked die modules have been proposed to provide high density information systems, but the power consumption and associated heat dissipation requirements for communicating data signals between stacked die modules using conductor-based connections can limit the achievable density. In addition, the bandwidth of such stacked die modules is limited by the number and inductance of TSVs and other conductor-based connections for such die stacks. To overcome such limitations, optical communication systems have been developed as a way of communicating at higher bandwidths with reduced power. With such optical communication systems, a monochromatic, directional, and coherent laser light beam is modulated to encode information for transfer to other devices or circuits of the system, typically by transferring modulated light signals along an optical fiber or waveguide path. Unfortunately, there are alignment challenges with using optical waveguides to transfer optical information between different integrated circuit (IC) chips in a system in terms of cost, complexity, and control requirements. These challenges arise from the tight alignment tolerances required to meet information transmission requirements and other use factors that can disrupt alignment during device operation. Attempts have been made to overcome these challenges by using external mirrors or deflectors to optically transfer information across free-space between different IC chips present their own difficulties, costs, and control requirements. For example, the optical transmitter, deflector structures, and the optical receiver not only impose additional costs and complexity, but must also be aligned to ensure a desired level of information transmission. In addition, alignment errors can be introduced by the system assembly process, as well as vibration (e.g., dropping) or temperature changes during use. For example, components of an optical link may become misaligned if a cell phone or notebook computer is dropped on a surface. Furthermore, the cost for designing and assembling components that are precisely aligned may be cost prohibitive. Finally, control circuits and external signal deflection structures can increase the overall system complexity, thereby reducing possible signal bandwidth between different IC chips. As a result, the existing solutions for transferring modulated light signals along optical waveguide paths and between different IC chips make the implementation of high bandwidth optical interconnects extremely difficult at a practical level.

BRIEF DESCRIPTION OF THE DRAWINGS

The present invention may be understood, and its numerous objects, features and advantages obtained, when the following detailed description is considered in conjunction with the following drawings, in which.

Figure 1:
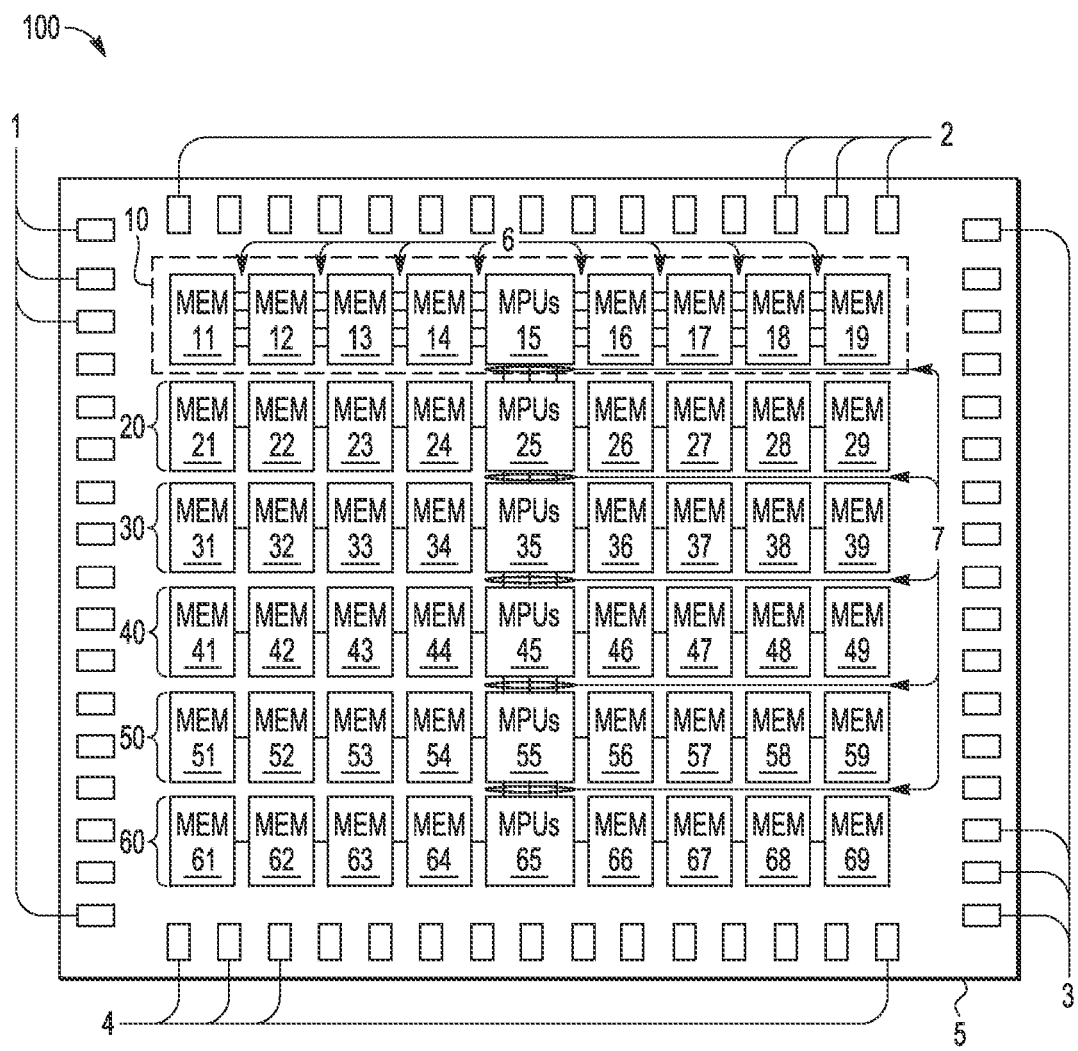
FIG. 1 illustrates a plan view of a communication system with side-by-side processor die stack and memory die stack modules connected via optical signals and arranged to form multiple subsystems on a board.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

In this disclosure, improved high density, low power, high performance information systems, methods, and apparatus are described that address various problems in the art where various limitations and disadvantages of conventional solutions and technologies will become apparent to one of skill in the art after reviewing the remainder of the present application with reference to the drawings and detailed description provided herein. In selected embodiments, a high density, low power, high performance information system, method and apparatus are described in which integrated optical communications are provided in and between stacked semiconductor die devices by providing MEMS optical beam waveguides with two-dimensional alignment and controlled feedback to adjust beam alignment. In the context of the present disclosure, an "optical beam" refers to an unmodulated light beam (directly from a light source, such as a laser, with no signal) or a modulated light beam (carrying a signal), where "light" can refer to any portion of the electromagnetic spectrum, whether visible or not. In addition, a "MEMS optical beam waveguide" refers to a physical structure for directing an optical beam, and includes a MEMS cantilever beam containing an optical waveguide. In embodiments where horizontal and vertical die stacks are incorporated on a system substrate, optical connections between different die stacks are providing by including deflectable MEMS optical beam waveguides with multiple deflection electrodes positioned on and around the MEMS optical beam waveguides to provide two-dimensional deflection for aligning communications over an optical link between two die without external deflection. A plurality of bias voltages for the deflection electrodes at each MEMS optical beam waveguide may be generated to control optical beam alignment by calibrating and continually adjusting digital MEMS optical beam waveguide deflection values using a feedback signal (FB) which characterizes the degree of optical beam alignment. In selected embodiments, the die stacks may include side-by-side processor die stack and memory die stack modules which are connected perpendicularly to each other using an optical crossbar arrangement to provide point-to-point optical signals at the processor-memory interface so that each processor die can communicate with any memory die in adjacent memory die stack modules and with any processor die in adjacent processor die stack modules. Of course, it will be appreciated that the die stack modules are not limited to processor or memory die stacks, and may be formed with any desired die for other uses, so there may be other embodiments with other uses for the structures described herein. The deflectable MEMS optical beam waveguides may be used to provide different optical communication functions, including providing point-to-point optical communications between two die without external deflection, providing optical waveguide crossover within a die, providing optical redundancy within a die to replace a defective optical circuit with a redundant optical circuit, and/or providing a die edge optical redundancy circuit for replacing a defective optical element with a redundant or spare optical element. By providing a replacement optical path which avoids or bypasses a failed circuit element or MEMS optical beam waveguide, the replacement optical path(s) may be defined by programming a pair of MEMS optical beam waveguide optical switches to shift around the defective circuit element or MEMS optical beam waveguide, thereby improving die and stack yield.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified cross sectional drawings of a semiconductor device without including every device feature or geometry in order to avoid limiting or obscuring the present invention. In addition, selected aspects are depicted with reference to simplified circuit diagram depictions without including every device circuit detail in order to avoid limiting or obscuring the present invention. Such descriptions and representations are used by those skilled in the art to describe and convey the substance of their work to others skilled in the art. Some portions of the detailed descriptions provided herein are also presented in terms of algorithms and instructions that operate on data that is stored in a computer memory. In general, an algorithm refers to a self-consistent sequence of steps leading to a desired result, where a "step" refers to a manipulation of physical quantities which may, though need not necessarily, take the form of optical, electrical, or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, hardware circuit, or similar electronic device, that manipulates and transforms data represented as physical (electronic) quantities within the computer system's registers and memories into other data similarly represented as physical quantities within the computer system memories or registers or other such information storage, transmission or display devices. In addition, although specific example materials are described herein, those skilled in the art will recognize that other materials with similar properties can be substituted without loss of function. It is also noted that, throughout this detailed description, certain materials will be formed and removed to fabricate the MEMS optical beam waveguides and associated control circuits. Where the specific procedures for forming or removing such materials are not detailed below, conventional techniques to one skilled in the art for growing, depositing, removing or otherwise forming such layers at appropriate thicknesses shall be intended. Such details are well known and not considered necessary to teach one skilled in the art of how to make or use the present invention.

Turning now to FIG. 1, there is shown a simplified plan view of an information system 100 with a plurality of die stacks arranged in rows 11-19, 21-29, 31-39, 41-49, 51-59, 61-69 and columns (e.g. 11, 21, 31, 41, 51, 61). In the depicted example, the information system 100 includes side-by-side processor die stack modules (e.g., 15, 25, 35, 45, 55, and 65) and memory die stack modules (e.g., 11-14 and 16-19) connected via optical signals 6, 7 and arranged to form multiple subsystems (e.g., 10, 20, 30, 40, 50, 60) on a system board 5. For example, a first subsystem 10 includes a central processor die stack module 15 connected between a row of memory die stack modules 11-14 and 16-19, all of which are connected together via optical signals 6. In similar fashion, the die stack modules 21-29 of the second subsystem 20 are connected together via optical signals 6 between the die stack modules 21-29, and are connected to the first subsystem 10 by one or more optical signals 7 between the central processor die stack modules 15, 25. Likewise, the rows of die stack modules 31-39, 41-49, 51-59, and 61-69 forming subsystems 30, 40, 50, 60, respectively, are connected together via optical signals 6, with connections between the subsystems 30, 40, 50, 60 provided by one or more optical signals 7 between the central processor die stack modules 25, 35, 45, 55, 65.

With the disclosed information system 100, a high density, low power, high performance packaging arrangement of die stack modules uses optical MEMs devices to provide optical communication links between die stacks in a subsystem, and between subsystems. For example, in a first subsystem 10, a microprocessor unit (MPU) die stack module 15 is formed with TSVs, copper pillars, flip chip bumps (not shown) to provide vertical signal and power conductors for the MPU die stack module 15. In addition, each MPU die may include optical MEMS devices, such as optical beam waveguides and optical feed-throughs (not shown), for sending and/or receiving lateral optical beam signals 6, 7 to adjacent die stack modules.

Once mounted on the system substrate board 5, the processor die stack modules (e.g., 15, 25, 35, 45, 55, and 65) and memory die stack modules (e.g., 11-14 and 16-19) may be connected through conductors (not shown) in the substrate board 5 to connection pads 1-4 for electrical and/or optical connection to external systems. In addition, the die stack modules may be implemented with both horizontal and vertical die stacks to facilitate optical signal communication between multiple die stacks of microprocessors and memory die. For example, by orienting the central MPU die stack module (e.g., 15) as a horizontal die stack and orienting the memory die stack modules (e.g., 11-14, 16-19) as vertical die stacks, the MPU and memory die stack modules are perpendicular to each other. This orientation enables each processor die in the MPU die stack module 15 to communicate with each of the memory die in the adjacent memory die stack modules 14, 16 using direct optical signals 6. And by including optical feed-throughs in the memory die stack modules (e.g., 12-14 and 16-18), the central MPU die stack module (e.g., 15) can communicate through a memory die stack module to one or more non-adjacent memory die stacks using feed-through optical signals 6. In similar fashion, by including optical feed-throughs in the processor die stack modules (e.g., 25, 35, 45, and 55), each processor in a central MPU die stack module can communicate with every other processor in the system using feed-through optical signals 7. In support of the optical signal communications, each processor and memory die in the die stack modules may be formed to integrate both transistor circuitry for implementing information handling operations, and optical circuitry for transmitting and/or receiving optical signal information via one or more waveguides terminating in MEMS optical beam waveguides at the die edge of the processor and memory die. By integrating multiple die stack modules with an optical communication system, the resulting communication system 100 provides higher density and bandwidth due to the replacement of electrical conductors (and associated inductances) with optical interconnects to provide a low cost, low power, high bandwidth stacked die assembly.

Figure 2:
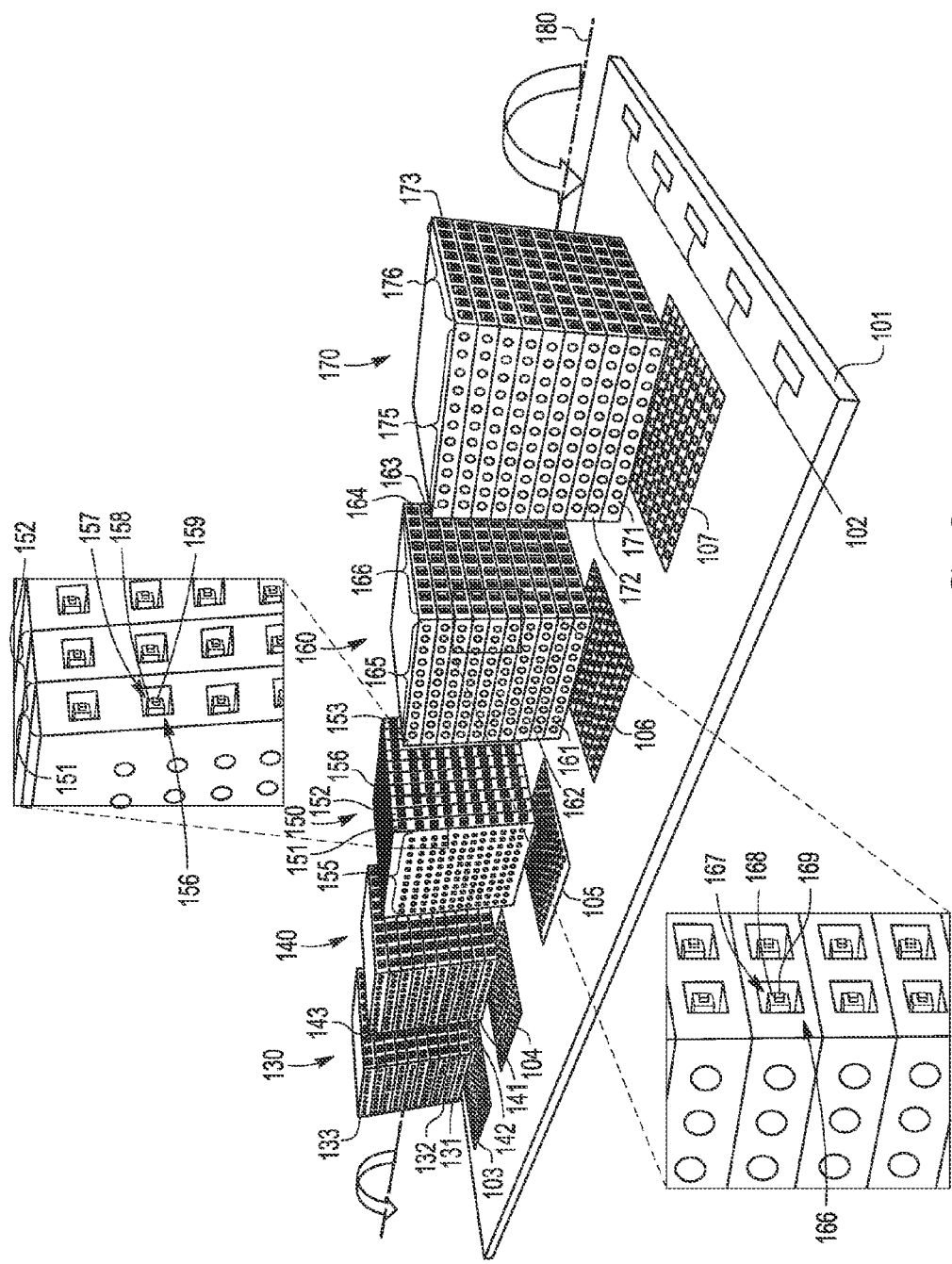
FIG. 2 illustrates a perspective view of a side-by-side die stack system with optical interconnects prior to rotation and attachment wherein a processor die stack module is oriented perpendicularly to one or more memory die stack modules.
Figure 3:
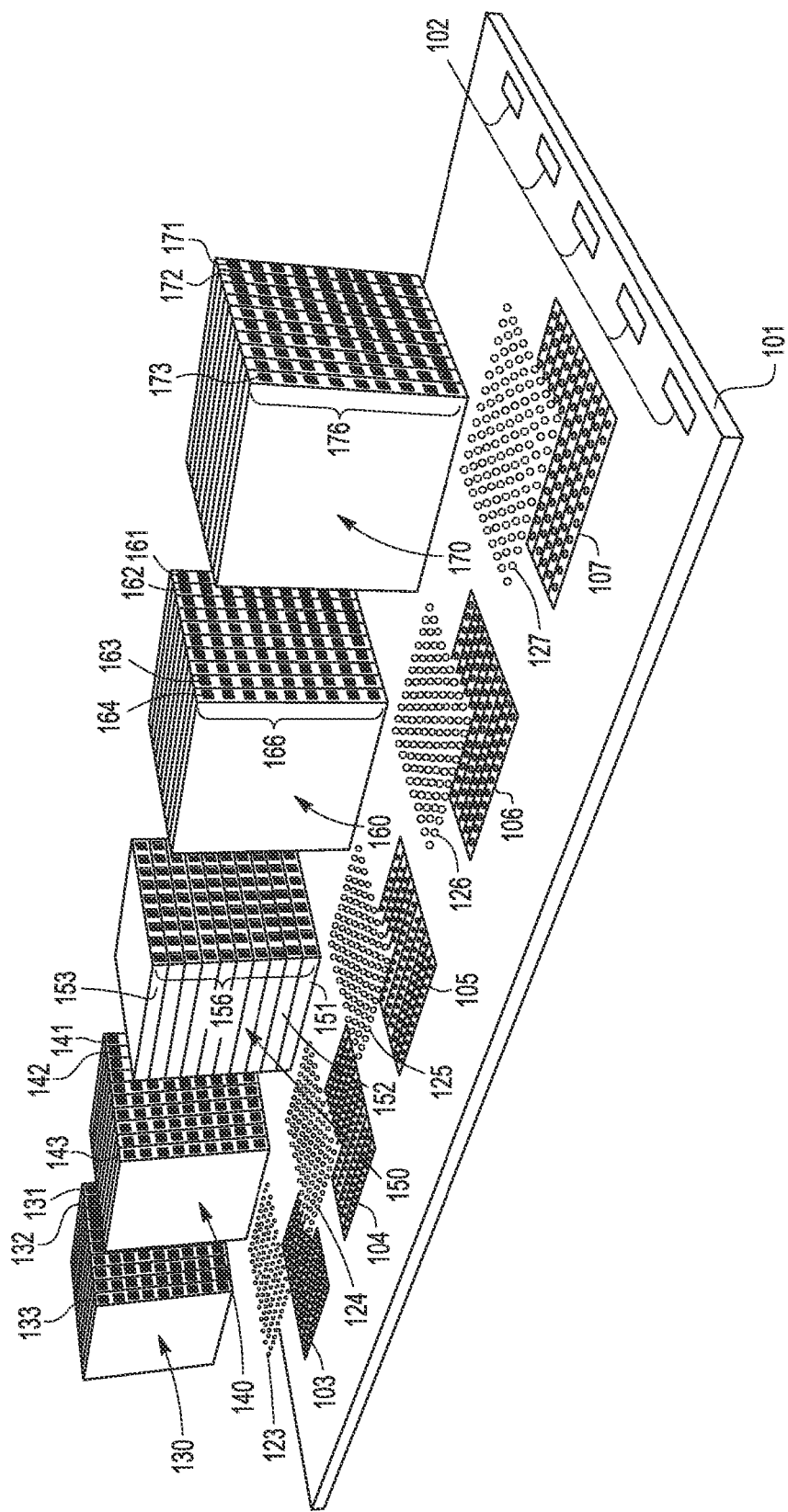
FIG. 3 illustrates a perspective view of the side-by-side die stack system with optical interconnects in FIG. 2 after rotation and alignment with solder ball arrays for connection to a system board.
Figure 4:
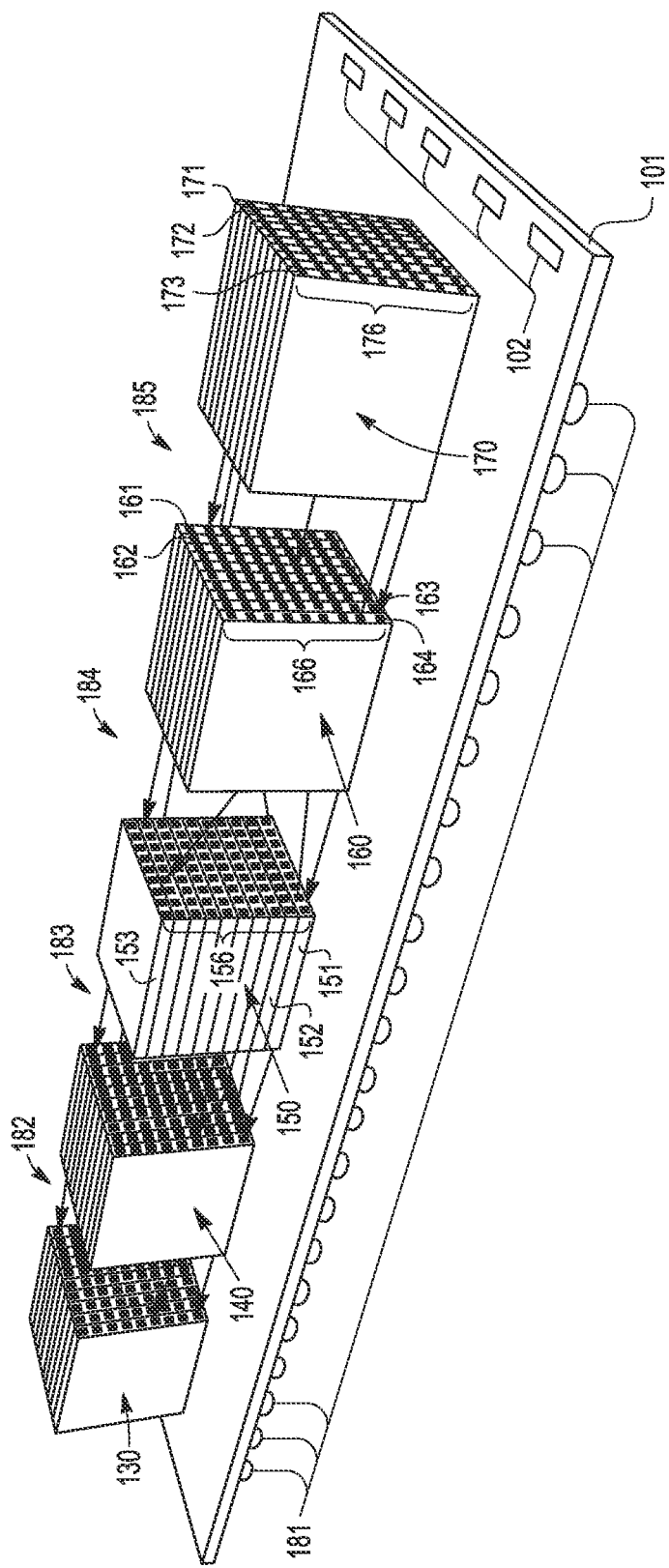
FIG. 4 illustrates a perspective view of the side-by-side die stack system in FIG. 3 after attachment of the die stack system to the system board with solder ball or flip-chip conductors to illustrate how point-to-point optical communications can be used to communicate between individual processor die and memory die in the die stack system.

To illustrate a fabrication assembly of an example stacked die assembly, reference is now made to FIGS. 2-4. Beginning with FIG. 2, there is shown a perspective view of a side-by-side stacked die assembly with optical interconnects in an initial stage of fabrication prior to rotation and attachment to the contact pads 103-107 on the system board 101. The depicted stacked die assembly includes a central processor die stack 150 which is formed with a plurality of processor die 151, 152, 153. As shown in the enlarged view of the central processor die stack 150 in FIG. 2, the processor die 151, 152, 153 are each oriented vertically (e.g., on a die edge) and vertically stacked together with a first processor die 151 in the front (or left) position, a second processor die 152 in the second position, and so on until the last processor die 153 in the back (or right-most) position. The enlarged view of the processor die stack 150 in FIG. 2 also shows that a die edge optical MEMS waveguide beam 156 is formed in a die edge cavity 157 with a waveguide beam structure which includes an optical beam structure 159 surrounded by an encapsulating waveguide structure 158 for guiding any modulated light signals along the path of the optical beam structure 159. In the central processor die stack 150, the processor die 151, 152, 153 are attached together with film adhesive, fusion wafer bonding, or any other suitable die attachment mechanism (not shown). If desired, the central processor die stack 150 may also include heat spreader and/or sink structures positioned between and/or around the individual processor die 151-153 to dissipate heat therefrom. To facilitate die-to-die signal and power connections within the processor die stack 150, each processor die 151, 152, 153 may include through silicon via (TSV) conductors. In addition, at least an edge processor die 151 may include a plurality of external pads or conductors 155 (e.g., approximately 1000), such as a filled TSV or edge connection pads, for providing electrical contact to thermoelectric devices, such as solder balls, copper pillars, or flip-chip bumps. In selected embodiments, the edge processor die 151 may also include optical TSV structures for providing optical contact to optical routing structures (e.g., optical beam waveguides) in the system board 101. Once mounted on the system board 101, the processor die stack 150 may be connected through conductors (not shown) in the system board 101 to connection pads 102 for electrical connection to external systems. Finally, each processor die 151-153 may include a plurality of optical MEMS waveguide beams 156 (e.g., approximately 100 to 200) at a lateral die edge for providing optical die-to-die communication with or through adjacent die stacks.

The depicted stacked die assembly also includes a plurality of memory die stacks (e.g., 130, 140, 160, and 170) positioned on opposite sides of the central processor die stack 150. On the left of the central processor die stack 150, a first memory die stack 130 includes a plurality of memory die 131, 132, 133 which are horizontally oriented and stacked together, and a second memory die stack 140 includes a plurality of memory die 141, 142, 143 which are horizontally oriented and stacked together. And to the right of the central processor die stack 150, a third memory die stack 160 includes a plurality of memory die 161, 162, 163, 164 which are horizontally oriented and stacked together, and a fourth memory die stack 170 includes a plurality of memory die 171, 172, 173 which are horizontally oriented and stacked together. Though two memory stacks are shown on each side, it will be appreciated that additional or fewer memory die stacks may be used. As shown in the enlarged view of the example memory die stack 160 in FIG. 2, the memory die (e.g., 161-164) are each oriented to be horizontally stacked together with a first memory die 161 on the bottom, a second memory die 162 on top of the first memory die 161, and so on until the top memory die 164 in the top position. In each memory die stack (e.g., 130, 140, 160, and 170), the memory die (e.g., 161-164, 171-173) are attached together with film adhesive, fusion wafer bonding, or any other suitable die attachment mechanism (not shown). The enlarged view of the memory die stack 160 in FIG. 2 also shows that a die edge optical MEMS waveguide beam 166 is formed in a die edge cavity 167 with a waveguide beam structure which includes an optical beam structure 169 surrounded by an encapsulating waveguide structure 168 for guiding any modulated light signals along the path of the optical beam structure 169. If desired, heat spreader and/or sink structures may be positioned between and/or around the memory die stacks to dissipate heat therefrom. To facilitate die-to-die signal and power connections within each memory die stack, each memory die (e.g., 161-164, 171-173) may include TSV conductors, and at least an edge memory die (e.g., 161, 171) may include a plurality of external pads or conductors 165, 175 (e.g., approximately 20) for edge bump connections to the system board 101, such as a filled TSV or edge connection pads. Once mounted on the system board 101, the memory die stacks may be connected through conductors (not shown) in the system board 101 to connection pads 102 for electrical connection to external systems. In addition, each memory die (e.g., 161-164, 171-173) may include a plurality of optical MEMS waveguide beams 166, 176 (e.g., approximately 100 to 200) at a lateral die edge for providing optical die-to-die communication with or through adjacent die stacks.

To facilitate die-to-die signal connections within each die stack, each die may include optical TSV structures and angled mirror structures (e.g., 45 degree mirror structures) for deflecting optical signals from a first die to one or more additional die in the die stack. For additional details on semiconductor processing steps that may be used to fabricate the waveguide beams, optical TSV structures, and angled mirror structures, reference is now made to U.S. patent application Ser. No. 13/914,178 (entitled "Optical Backplane Mirror" and filed Jun. 10, 2013) which is incorporated by reference as if fully set forth herein. Though described with reference to selected optical backplane die embodiments, it will be appreciated that the fabrication process steps described in the "Optical Backplane Mirror" application can also be used to form optical TSV structures, and angled mirror structures in each die.

In other embodiments, the die in the die stacks 130, 140, 150, 160, 170, such as the processor die 151 or memory die 161, may be formed as a composite of two separately manufactured die. In these embodiments, the first die includes electrical components that are formed using standard semiconductor transistor fabrication technology, and the second die includes optical components, such a waveguides, modulators and laser sources, that are formed using primarily optical fabrication technology. By separately fabricating the composite die using different fabrication technologies, the manufacturing cost of processor die and the memory die can be reduced, thus allowing for a lower cost of system 100. In selected embodiments, the first and second composite die could be combined before stacking so the die stacks would be an assembly of composite die. In other embodiments, the electrical and optical die would remain separate until combined into the die stack modules.

In the illustrated die stack assembly shown in FIG. 2, the central processor die stack 150 is oriented perpendicularly to the memory die stacks (e.g., 130, 140, 160, and 170), with the central processor die stack module 150 oriented as a vertical die stack 151-153, and the memory die stack modules 130, 140, 160, 170 oriented as horizontal die stacks 131-133, 141-143, 161-164, 171-173 so as to be perpendicular to each other. This relative perpendicular orientation is maintained as the depicted stacked die assembly is rotated ninety degrees around the rotation axis 180, as illustrated in FIG. 3 which shows a perspective view of the side-by-side stacked die assembly with optical interconnects in FIG. 2 after rotation and alignment. However, after rotation, the central processor die stack module 150 is oriented as a horizontal die stack 151-153, and the memory die stack modules 130, 140, 160, 170 are oriented as vertical die stacks 131-133, 141-143, 161-164, 171-173 so as to be perpendicular to each other. As illustrated in FIG. 3, the processor and memory die stack modules 130, 140, 150, 160, 170 are oriented and aligned with a corresponding plurality of thermoelectric conductor arrays 123-127 (e.g., solder balls, copper pillars, or flip-chip bumps) to make electrical connection with the contact pads 103-107 on the system board 101. In particular, the rotated orientation of the die stack assembly positions the external pads or conductors (e.g., 155, 165, 175) on the processor and memory die stacks (e.g., 150, 160, and 170) to make electrical contact with the contact pads (e.g., 105-107) on the system board 101.

Turning now to FIG. 4, there is shown a perspective view of the side-by-side stacked die assembly in FIG. 3 after attachment of the processor and memory die stack modules 130, 140, 150, 160, 170 to the system board 101 having external conductors 181, such as copper pillars, solder balls or flip chip interconnects, connected on an opposite side. Though not visible in FIG. 4, the thermoelectric conductor arrays 123-127 (from FIG. 3) are positioned between the system board 101 and the processor and memory die stack modules 130, 140, 150, 160, 170 to make electrical connection with the contact pads 103-107 on the system board 101. In selected embodiments, the solder ball or flip chip arrays 123-127 are soldered in place on the system board 101 in a reflow furnace, and then the stacked die assembly is placed on the solder ball or flip chip arrays 123-127 for a second reflow. In other embodiments, the thermoelectric conductor arrays 123-127 may be implemented with solder ball or flip chip arrays that are formed as reflow solder balls on the bottom of the die stacks. In yet another embodiment, the solder ball or flip chip arrays 123-127 are placed on the system board 101 with flux, followed by placing the die stacks and reflowing the entire group together.

Once attached to the system board 101, point-to-point optical communications can be used to communicate between individual processor die and memory die in the stacked die assembly. For example, the processor die stack module 150 may communicate with the adjacent memory die stacks 140, 160 using point-to-point optical beam signals 183, 184, respectively. And by using optical feed-throughs in the memory die stacks 140, 160 formed with waveguides in the die that are connected to MEMS optical beam waveguides at each die edge, the processor die stack module 150 may communicate with the non-adjacent memory die stacks 130, 170 using point-to-point optical beam signals 182, 185.

Figure 5:
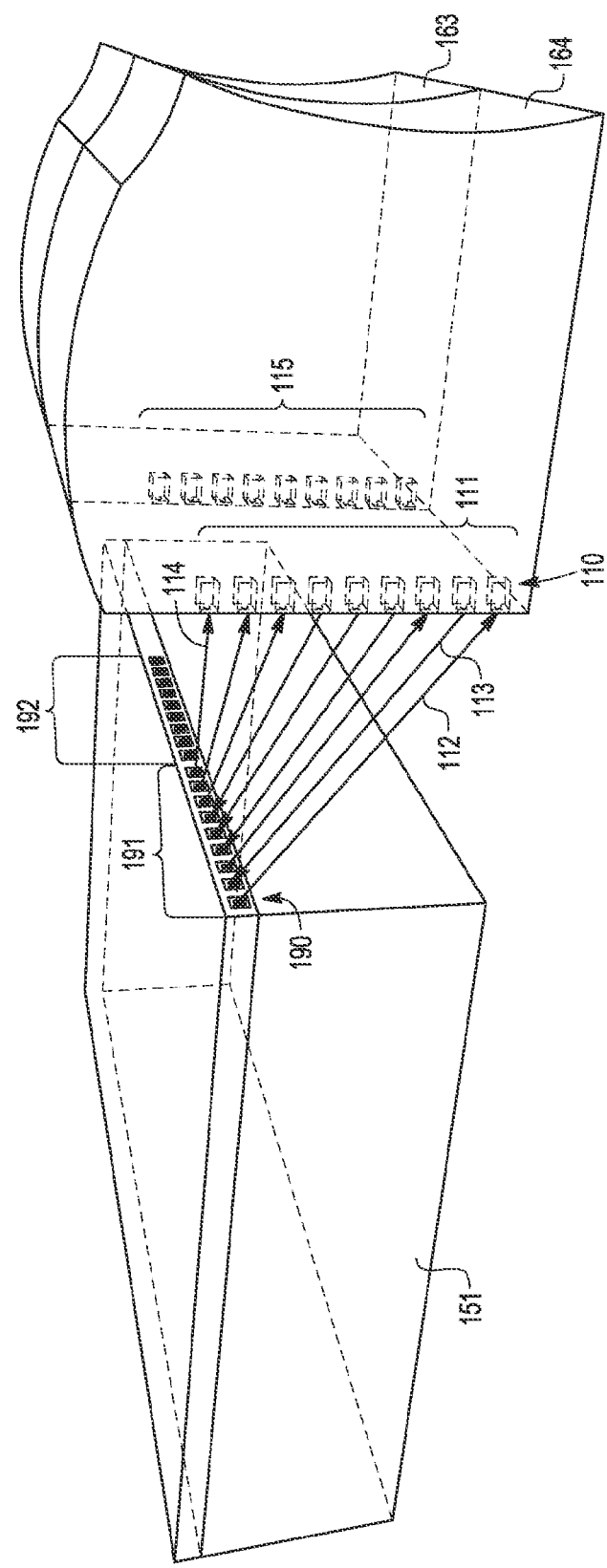
FIG. 5 illustrates a perspective view of a selected processor die and memory die in the die stack system of FIG. 4 to illustrate the optical crossbar alignment of point-to-point optical beams at a processor-memory interface.

Given the perpendicular orientation of the processor and memory die, each laterally disposed processor die (e.g., 151) may be disposed to provide point-to-point optical communications with each of the plurality of vertically disposed memory die (e.g., 161-164) in the adjacent memory die stack (e.g., 160). To this end, the optical MEMS waveguide beams 156 on the die edge of processor die 151 may be divided into groups, with each group of MEMS waveguide beams assigned to a different memory die. To illustrate this grouping, reference is now made to FIG. 5 which shows a partial perspective view of the bottom processor die 151 and front memory die 164 from the stacked die assembly of FIG. 4 to illustrate the optical crossbar alignment of point-to-point optical beams therebetween. As depicted, the optical MEMS waveguide beams on the die edge of processor die 151 are divided into groups of MEMS waveguide beams 191, 192, with each group assigned to a different memory die. In the depicted example, the first group of optical MEMS waveguide beams 191 is assigned to communicate with the memory die 164 by making point-to-point optical communications with a group of optical MEMS waveguide beams 111 on the memory die 164. As illustrated in FIG. 5, the terminal ends of the optical MEMS waveguide beams 111 are located on a hidden face of the memory die 164 facing the first group of optical MEMS waveguide beams 191, and are therefore shown with dotted lines. In particular, a first optical MEMS waveguide beam 190 on the processor die 151 is aligned to send an optical signal 112 to a first optical MEMS waveguide beam 110 on the memory die 164. In similar fashion, the remainder of the first group of optical MEMS waveguide beams 191 on the processor die 151 is aligned to send optical signals 113-114 to the remainder of the group of optical MEMS waveguide beams 111 on the memory die 164. In similar fashion, the second group of optical MEMS waveguide beams 192 on the processor die 151 is aligned to send optical signals (not shown) to a group of optical MEMS waveguide beams 115 located on a hidden face of the memory die 163 facing the second group of optical MEMS waveguide beams 192, and are therefore shown with dotted lines, and so on. Bidirectional communications over an optical link between two die requires a MEMS waveguide beam at each end of the link since a transmitting beam must be aligned at a target receptor.

With the disclosed crossbar alignment, the die interface region defined by the intersection of the processor and memory die may include a plurality of optical MEMS waveguide beams (e.g., 191) at the processor die edge and a corresponding plurality of optical MEMS waveguide beams (e.g., 111) at the memory die edge. As a result, multiple optical beams can be exchanged at the vertical die/horizontal die interface region. With spacing between adjacent MEMS waveguide beams on a die edge approaching 7-10 microns, the required angle for beam alignment becomes small. In addition, each group of optical MEMS waveguide beams at a vertical die/horizontal die interface region may include one or more unmodulated beams, one or more feed-through unmodulated optical beams, one or more processor to memory optical beams, and/or one or more feed-through modulated optical beams.

In addition to the perpendicular orientation of the processor and memory die stacks, the ability to maintain point-to-point optical communications between the processor and memory die stacks can be impaired by a number of factors, such as the lateral stack spacing and any difference in die thickness or height between the processor and memory die. Unmitigated, these factors can impose significant beam angle requirements for the optical beam signals 183, 184 to and from the processor die stack 150. To reduce the beam angle requirements, a die stack spacing of approximately 100 mm to 200 mm may be used between stacked die modules. In addition, the height of the memory die stack modules relative to the processor die stack may be adjusted by forming TSV spacers below each memory die stack module to raise the memory die stacks and improve beam angle to the processor die.

An approach for achieving precise alignment for point-to-point optical communication signals is to use deflectable MEMS optical waveguide beams. While optical MEMS devices have been used to provide moving waveguides, such devices typically use a single continuous electrode alongside the waveguide beam to provide one-dimensional control over movement, and often use external mirror to deflect the optical signal. To overcome limitations associated with such conventional approaches, there is disclosed herein an optical MEMS waveguide beam with multiple deflection electrodes to provide two-dimensional deflection for alignment of point-to-point optical interconnects. In particular and as illustrated in FIG. 6, there is shown an enlarged perspective view of a MEMS optical beam waveguide (e.g., 190) at a die edge (e.g., at processor die 151).

Figure 6:
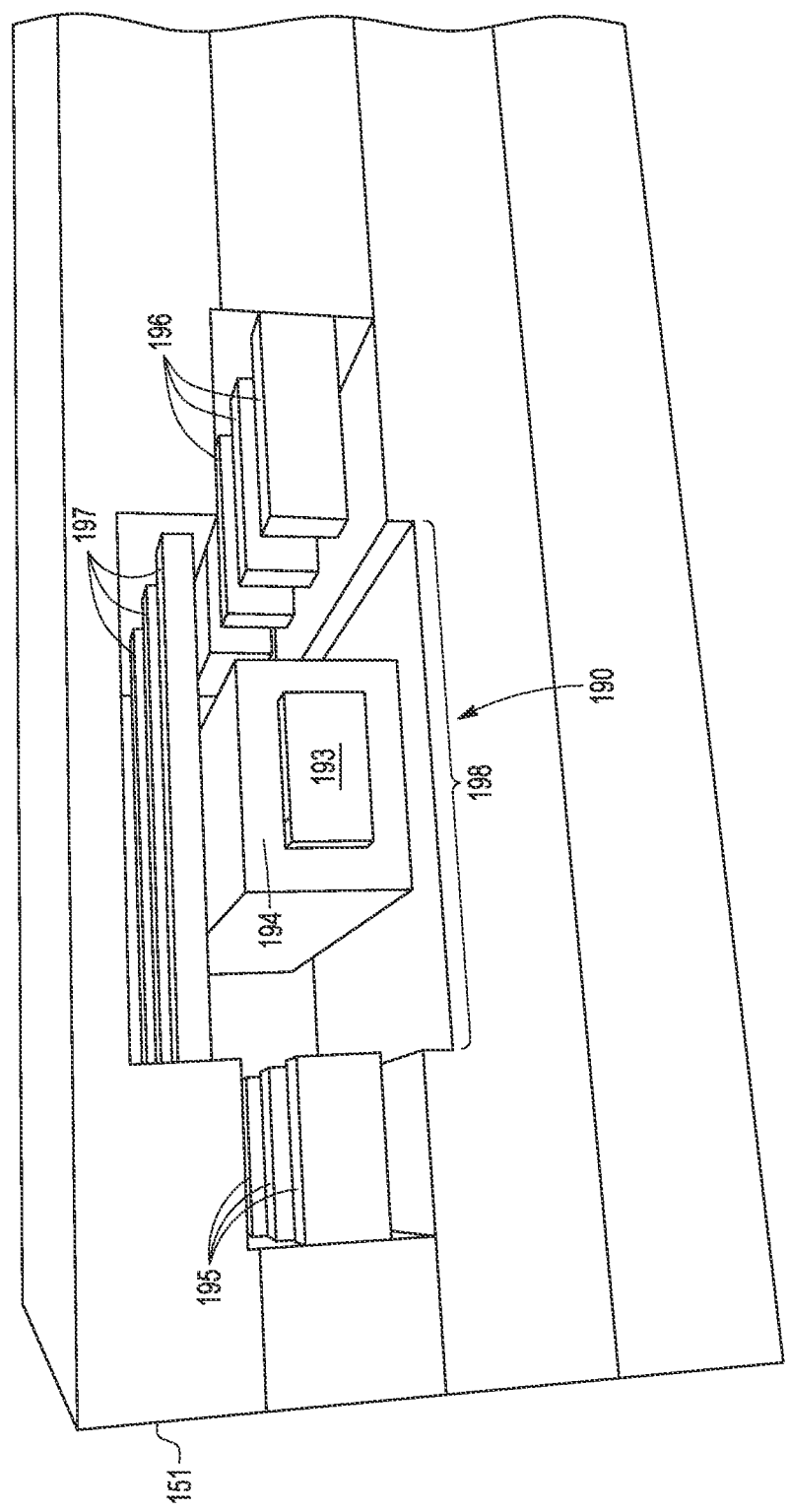
FIG. 6 illustrates an enlarged perspective view of a MEMS optical beam waveguide with multiple deflection electrodes to provide two-dimensional deflection for alignment of point-to-point optical interconnects.

As shown in the enlarged view of FIG. 6, the die edge optical MEMS waveguide beam 190 is formed in a die edge cavity 198 with a waveguide beam structure which includes an optical beam structure 193 surrounded by an encapsulating waveguide structure 194. As formed, the encapsulating waveguide structure 194 encloses the sides of the optical beam structure 193 to limit dispersion of light therefrom, thereby guiding any modulated light signals along the path of the optical beam structure 193. To provide two-dimensional deflection control for aligning point-to-point optical interconnects, the MEMS waveguide beam 190 includes multiple deflection electrodes 195-197 so that different voltages can be applied to the deflection electrodes 195-197. For example, a first plurality of separate electrodes 195 are formed on a first side of the MEMS waveguide beam structure 193, 194 in order to exert lateral deflection force thereon. In addition, a second plurality of separate electrodes 196 may be formed on an opposite side of the MEMS waveguide beam structure 193, 194 for exerting additional lateral deflection force on the waveguide beam. To provide a vertical deflection force, a plurality of separate electrodes 197 are formed above the MEMS waveguide beam structure 193, 194, and if desired, and if desired, one or more additional electrodes (not shown) may be formed below the MEMS waveguide beam structure 193, 194. By using separate electrodes 195-197 alongside the enclosed optical MEMS waveguide beam 190 that may be independently controlled, two-dimensional alignment control may be provided in both x (lateral) and y (vertical) directions to provide fine steering control for aligning optical communication signals. As will be appreciated, the electrical conductors necessary to operate the separate electrodes 195-197 are not shown in FIG. 6, and have been omitted from the drawing in order to minimize visual complexity.

In selected embodiments, separate electrodes may be along the sides of the beam allows different voltages to be applied at different points along the beam. In this way, different electrode-induced deflection forces can be applied along the length of the MEMS waveguide beam structure 193, 194 to increase or decrease the deflection force applied to different sections thereof. For example, by increasing the deflection voltages along the length of the MEMS waveguide beam structure, the amount of deflection increases along its length. However, to reduce the risk of stress fractures at the base of the MEMS waveguide beam structure, the deflection voltages applied to at least a first electrode at the base of the MEMS waveguide beam structure may have opposite polarity to the deflection voltages applied to the electrodes at the end of the MEMS waveguide beam structure, thereby reducing the deflection stress at the base.

Figure 7:
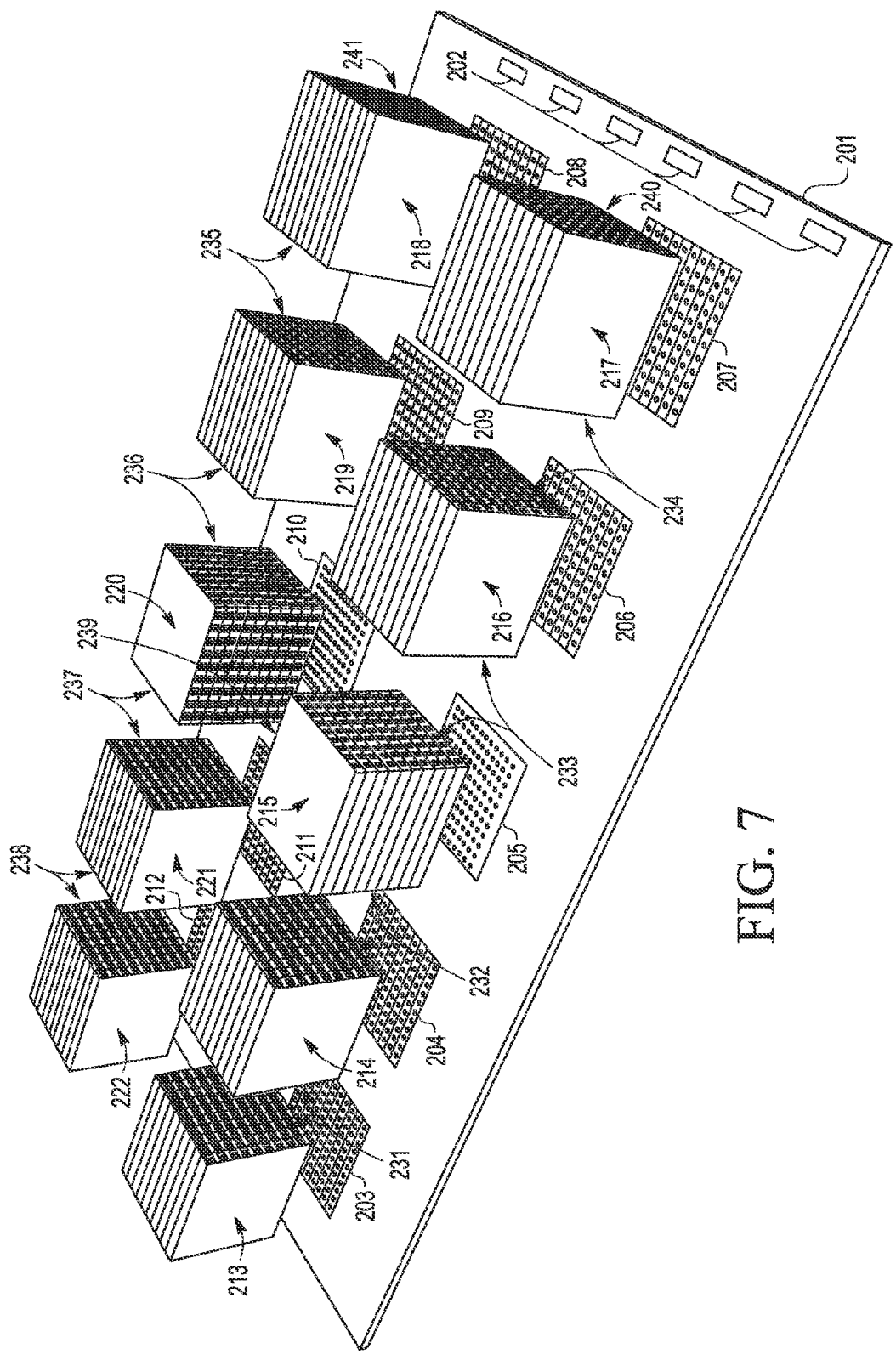
FIG. 7 illustrates a perspective view of a plurality of side-by-side die stack systems with optical interconnects for attachment to a system board to illustrate how point-to-point optical communications can be used to communicate between individual die in the plurality of side-by-side die stack systems.

By integrating a MEMS beam with optical waveguide and two-dimensional deflection control, a high performance packaging arrangement is provided which uses separate electrodes along the sides of an enclosed optical beam to limit dispersion of light from within the beam and to provide alignment control that may be used to provide optical communication between die stacks in a plurality of communication subsystems. An example of such a packaging arrangement is illustrated in FIG. 7 which shows a perspective view of a plurality of side-by-side die stack systems 213-222 with optical interconnects for attachment to a system board 201 to illustrate how point-to-point optical communications can be used to communicate between individual die in the plurality of side-by-side die stack systems. In a first subsystem 213-217, a central processor die stack 215 and a plurality of memory die stacks 213-214, 216-217 (positioned on opposite sides of the central processor die stack 215) are oriented and aligned to make electrical connection with the contact pads 203-207 on the system board 201 using a corresponding plurality of thermoelectric conductor arrays (not shown). In addition, a second subsystem 218-222 includes a central processor die stack 220 and a plurality of memory die stacks 218-219, 221-222 which are oriented and aligned to make electrical connection with the contact pads 208-212 on the system board 201 using a corresponding plurality of thermoelectric conductor arrays (not shown). Of course, it will be appreciated that the die stack systems 213-222 are not limited to processor or memory die stack implementations, and may be formed with any desired die for other uses, so there may be other embodiments with other uses for the structures described herein. Processing details for the fabrication, assembly, and attachment of the individual processor and memory die stacks 213-222 may proceed substantially as set forth above, and therefore will not be repeated here, other than to note that any suitable die attachment mechanism and thermoelectric conductor connections (e.g., solder ball or flip-chip connections) may be used to attach and electrically connect the die stacks 213-222 through conductors (not shown) in the system board 201 to connection pads 202 for electrical connection to external systems.

To enable optical communication, the die stacks in the first subsystem (e.g., 213-217) include a plurality of optical die edge MEMS waveguide beams 231-234 having two-dimensional alignment control to provide the central processor die stack (e.g., 215) with optical die-to-die communication with or through adjacent memory die stacks (e.g., 213-214, 216-217). Likewise, the die stacks in the second subsystem (e.g., 218-222) include a plurality of optical die edge MEMS waveguide beams 235-238 having two-dimensional alignment control to provide the central processor die stack 220 with optical die-to-die communication with or through adjacent memory die stacks 218-219, 221-222. (If any additional memory die stacks are included in either subsystem, the memory die stacks 217-218 are shown as having optical die edge MEMS waveguide beams 240, 241.) Finally, optical communication between subsystems is provided by including a plurality of optical die edge MEMS waveguide beams 239 at each processor die stack 215, 220 to enable two-dimensional alignment control for optical die-to-die communication therebetween.

To illustrate an example fabrication sequence for forming integrated circuit optical MEMS waveguide beams, reference is now made to FIGS. 8-17 which illustrate partial plan and cutaway side views of various stages in the production of a MEMS optical beam waveguide with full coverage of the sides of the waveguide and two-dimensional motion control from separate sets of x and y direction electrodes positioned around the MEMS optical beam waveguide that may be independently controlled. In the embodiments shown in FIGS. 8-17, the optical beam waveguide is completely encapsulated by a waveguide material that does not include any metallization along the sides of the optical beam waveguide, though in other embodiments, a metallization layer may be added to one or more sides of the optical beam waveguide.

Figure 8:
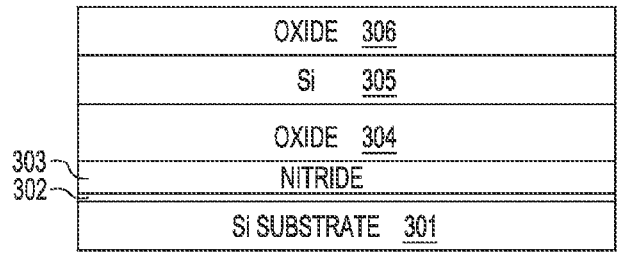
FIGS. 8-17 illustrate partial plan and cutaway side views of various stages in the production of an integrated circuit die including a MEMS optical beam waveguide with multiple deflection electrodes positioned around the MEMS optical beam waveguide according to a first example embodiment of the present disclosure.

Referring first to FIG. 8, there is shown a partial cutaway side view of a semiconductor wafer structure formed as a starting stack with a plurality of substrate layers 301-306. In selected embodiments, the wafer structure includes a bulk silicon substrate 301 formed with monocrystalline silicon, though other materials may be used for the substrate layer 301. On the substrate layer 301, a thin oxide layer or pad oxide layer 302 may be formed by depositing or thermally growing silicon oxide to a predetermined thickness (e.g., approximately 1-50 nm), though other materials and thicknesses could be used, such as when the pad oxide layer 302 is used to prevent silicidation of the substrate 301 surface if desired during the later formation steps. On the oxide layer 302, a silicon nitride layer 303 and oxide layer 304 are sequentially formed on the wafer structure. In selected embodiments, the nitride layer 303 is deposited by a chemical vapor deposition (CVD) or thermal deposition process to a predetermined thickness (e.g., 1000 nm or other suitable thickness for forming the cavity during later formation steps) which is controlled to define part of the subsequently formed waveguide beam cavity. In addition, the oxide layer 304 may be formed by depositing silicon oxide or another appropriate dielectric material to a predetermined thickness (e.g., 1000 nm or other suitable thickness for encapsulating the waveguide) using a CVD or thermal deposition process, alone or in combination with a planarization or polish step. On the oxide layer 304, a silicon substrate layer 305 and oxide layer 306 are sequentially formed. In selected embodiments, the silicon substrate layer 305 may be formed by epitaxially growing monocrystalline silicon or depositing polysilicon using any desired CVD or thermal deposition process to a predetermined thickness (e.g., 1000 nm or other suitable thickness for forming the waveguide) which is controlled to define the subsequently formed optical beam structure. In certain embodiments, the polysilicon is annealed to form large silicon grains. In addition, the oxide layer 306 may be formed by depositing silicon oxide or another appropriate dielectric material to a predetermined thickness (e.g., 1000 nm or other suitable thickness for encapsulating the waveguide) using a CVD or thermal deposition process, alone or in combination with a planarization or polish step. As will be appreciated, the starting stack of substrate layers 301-306 may be formed as a semiconductor-on-insulator (SOT) substrate wafer structure in which the silicon substrate layer 305 and underlying substrate layer 301 are bonded together to include a buried oxide layer formed with the oxide layer 304.

Figure 9:
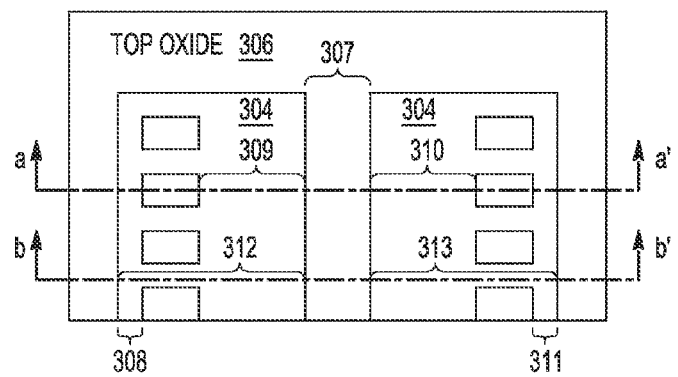
Figure 10:
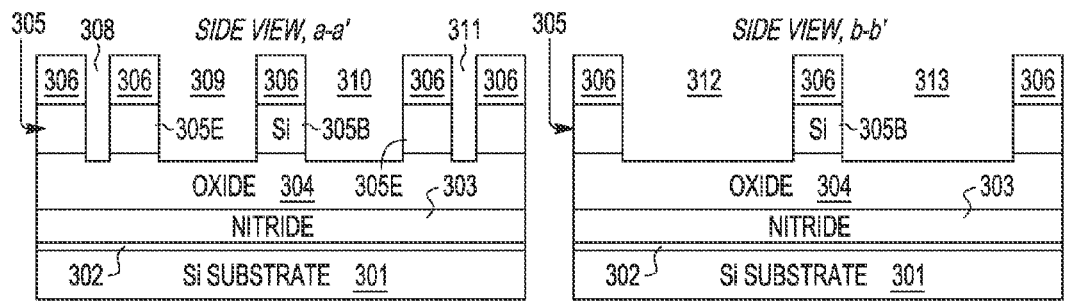

FIG. 9 illustrates processing of the semiconductor wafer structure subsequent to FIG. 8 with a partial plan view after portions of the layers 305-306 have been patterned and etched to form a patterned partial waveguide beam structure 307 to selectively expose the oxide layer 304 with a plurality of etched openings 308-313. Along selected cross sections (e.g., line a-a'), the dimensions of the different etch openings 308-313 may be controlled to define left and right electrode structures 305E and a central waveguide beam structure 305B (as shown in FIG. 10) with the relatively narrow outer openings 308, 311 and relatively wider inner openings 309, 310. At other cross sections (e.g., line b-b'), the dimensions of the different etch openings 308-313 may be controlled to define only the central waveguide beam structure 305B with the openings 312, 313 (as shown in FIG. 10). While any desired pattern and etch process may be used, the etched openings 308-313 may be formed by forming a photoresist mask or other masking material (not shown) that is patterned, developed, and etched using appropriate anisotropic etch chemistries to protect the top oxide layer 306 and expose the underlying oxide layer 304 where the openings 308-313 are formed. As shown in FIG. 10 with the partial cutaway side view of the semiconductor wafer structure along section a-a', the openings 308-311 define the silicon layer 305 to include left and right electrode structures 305E positioned on opposite sides of a central waveguide beam structure 305B. However, in selected embodiments, the left and right electrode structures 305E do not run along the entire length of the central waveguide beam structure 305B, but instead may be divided into separate electrodes, as shown in FIG. 10 with the partial cutaway side view of the semiconductor wafer structure along section view b-b' in which the openings 312-313 define the silicon layer 305 to include a central waveguide beam structure 305B without left and right electrode structures.

Figure 11:
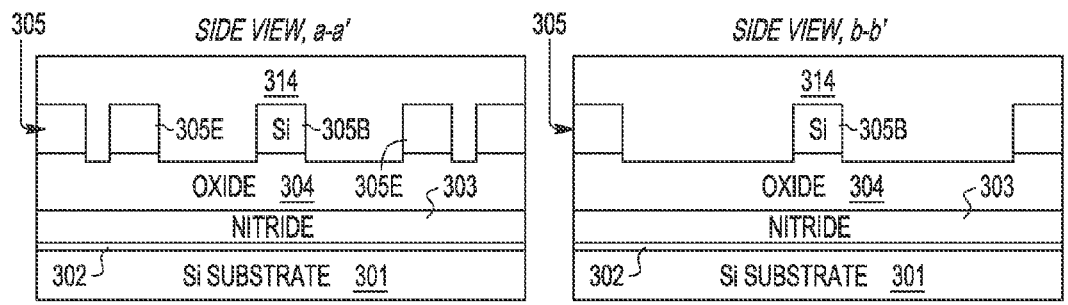

FIG. 11 illustrates processing of the semiconductor wafer structure subsequent to FIG. 10 with the partial cutaway side views a-a', b-b' after an oxide layer 314 is formed in the recess openings 308-313. In selected embodiments, the oxide layer 314 may be formed by depositing a silicon dioxide layer over the wafer structure and then subsequently planarizing or polishing the wafer structure. While any desired material and thickness can be used for the deposited dielectric layer 314, it will be appreciated the material and thickness should be selected which provides a waveguide function to protect against dispersion of light from the central waveguide beam structure 305B.

Figure 12:
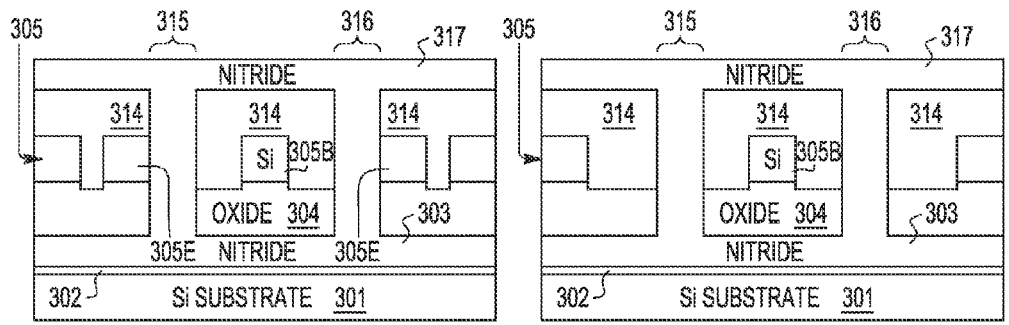

FIG. 12 illustrates processing of the semiconductor wafer structure subsequent to FIG. 11 with the partial cutaway side views a-a', b-b' after portions of the layers 304, 314 have been patterned and etched to form patterned openings 315, 316 to selectively expose the underlying nitride layer 303 without substantially etching the electrode structures 305E or central waveguide beam structure 305B. While any desired pattern and etch process may be used, the etched openings 315-316 may be formed with a photoresist mask or other masking material (not shown) that is patterned, developed, and etched using appropriate anisotropic etch chemistries to protect the top oxide layer 314 and expose the underlying nitride layer 303. In particular, the etched openings 315-316 expose the interior side surfaces of the left and right electrode structures 305E (where present), and create an opening down to the underlying nitride layer 303 for the subsequently formed waveguide beam cavity. In the etched openings 315-316, a silicon nitride layer 317 is formed to cover the wafer structure, such as by using a nitride CVD or thermal deposition process. At this point, the central waveguide beam structure 305B is completely surrounded by oxide, and the waveguide beam cavity is filled with nitride. After filling the etched openings 315-316 to cover the wafer structure with nitride, the nitride layer 317 may be polished or planarized with a suitable nitride polish process.

Figure 13:
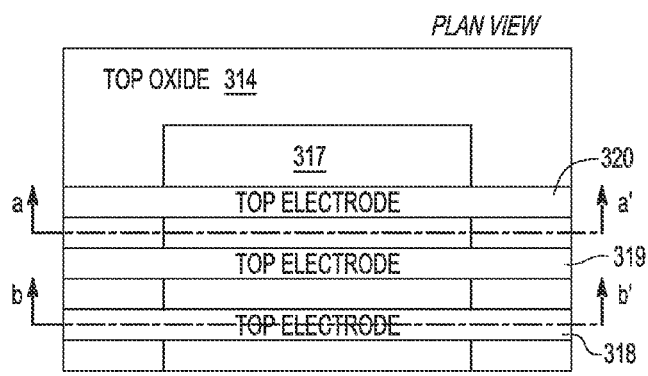
Figure 14:
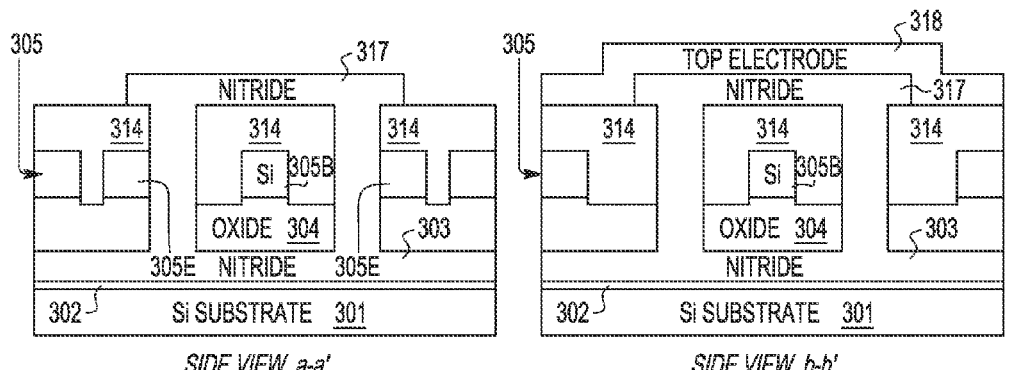

FIG. 13 illustrates a partial plan view of the processing of the semiconductor wafer structure subsequent to FIG. 12 after the nitride layer 317 is patterned and removed from areas outside the optical beam waveguide area, and a plurality of top electrode structures 318-320 are then formed over the optical beam waveguide area with a suitable conductive material. The nitride layer 317 may be patterned using any desired pattern and etch process to protect the optical beam waveguide area and otherwise remove the nitride layer 317. While any desired electrode formation process may be used, the top electrode structures 318-320 may be formed by depositing a conductive layer (e.g., polysilicon or metal or some combination thereof), and then patterning a photoresist mask or other masking material (not shown) to selectively etch the conductive layer to define the top electrode structures 318-320 over the top oxide layer 314 and top nitride layer 317. In selected embodiments, the positioning of the top electrode structures 318-320 and electrode structures 305E may be staggered or interleaved in a non-overlapping arrangement. This is shown in FIG. 14 with the partial cutaway side view of the semiconductor wafer structure along section view a-a', where the top electrode structures are not formed over the left and right electrode structures 305E. In contrast, FIG. 14's partial cutaway side view of the semiconductor wafer structure along section view b-b' shows that the top electrode structure (e.g., 318) is formed over the central waveguide beam structure 305B in regions where the left and right electrode structures 305E are not formed. In other embodiments, the top and lateral electrode structures need not be interleaved.

Figure 15:
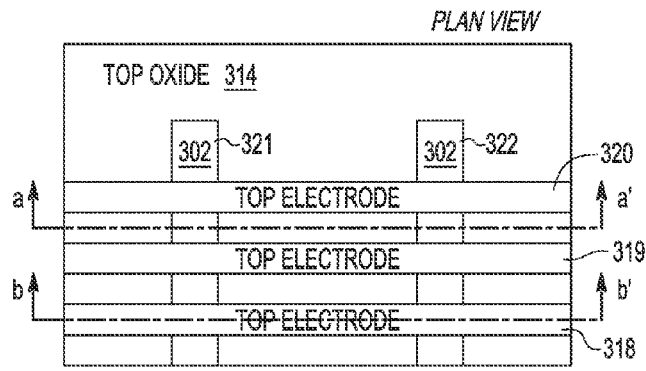

FIG. 15 illustrates processing of the semiconductor wafer structure subsequent to FIG. 14 with a partial plan view after portions of the nitride layers 303, 317 are at least partially etched or removed to form openings 321, 322 between the previously etched dielectric layers 304, 314 and electrode structures 305E to expose the underling pad oxide layer 302. At a minimum, the entirety of the nitride layers 303, 317 surrounding the central waveguide beam structure 305B is removed to provide a deflection cavity 321, 322. Any desired etchant process may be used that is capable of selectively removing the nitride layers 303, 317 from the wafer structure in a controlled way. For example, the nitride layers 303, 317 may be etched down to the pad oxide layer 302, preferably by using a wet etch chemistry (e.g., phosphoric acid) that is selective to the exposed dielectric material layers 302, 304, 314 and any exposed silicon layers 305. However, it will be appreciated that other techniques can be used to avoid using a controlled etch process to selectively remove the nitride layers 303, 317. However accomplished, the removal of the nitride layers 303, 317 forms a waveguide beam cavity around the central waveguide beam structure 305B and exposes any adjacent electrode structures 305E. This is shown in FIG. 16 with the partial cutaway side view of the semiconductor wafer structure along section views a-a', b-b' after portions of the nitride layers 303, 317 have been removed to form cavity openings 321, 322 on opposite sides of the central waveguide beam structure 305B which also expose the electrode structures 305E (where present).

Figure 16:
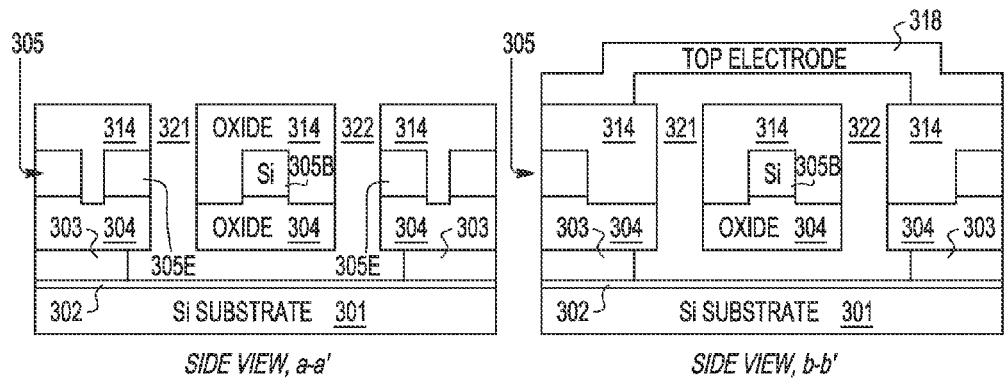
Figure 17:
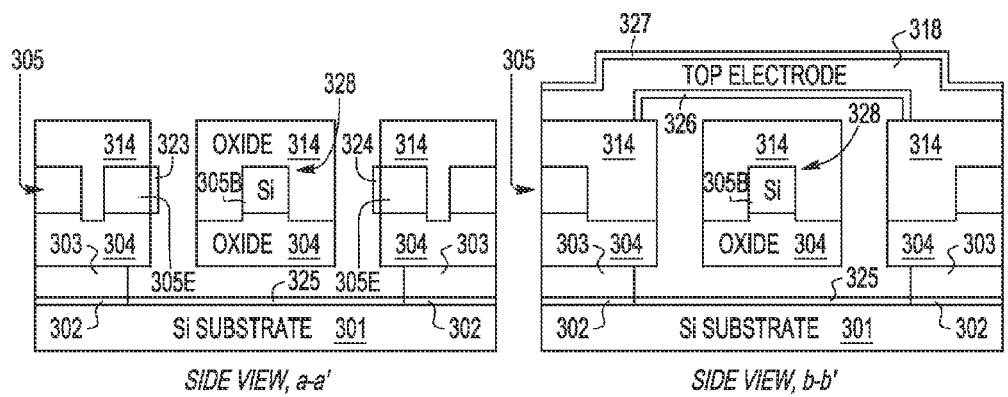

FIG. 17 illustrates processing of the semiconductor wafer structure subsequent to FIG. 16 with the partial cutaway side views a-a', b-b' after silicide layers 323-324, 326-327 are formed on at least the top electrode structures 318-320 and any exposed electrode structures 305E. Since the optical beam waveguide is formed with a cantilevered silicon beam 328 that is encapsulated with oxide waveguide layers 304, 314, there is no silicide formed on the optical beam waveguide structure. If desired, one or more bottom gate electrode structures 325 may also be formed below the central waveguide beam structure 305B by (selectively) removing the thin pad oxide layer 302 by applying a suitable etch chemistry in the waveguide beam cavity prior to silicide formation. For example, a light oxide etch process (e.g., $CHF_3$, $C_2F_6$, or $C_4F_8$ and argon gas) may be applied to remove the exposed thin pad oxide layer 302. After the oxide etch, the exposed portions of the top electrode structures 318-320, electrode structures 305E, and silicon substrate 301 are silicided to form silicide layers 323-327 using a suitable material (e.g., tungsten), alone or in combination with a barrier layer (e.g., titanium, tantalum, or nitrides thereof). This resulting silicide electrodes are shown in FIG. 17 with the partial cutaway side view of the semiconductor wafer structure along section views a-a', b-b' in which the top electrode structure 318 includes silicide layers 326, 327 and the electrode structures 305E include silicide layers 323-324. In addition, the bottom electrode(s) may be formed with the bottom electrode silicide layer 325.

Though the bottom gate electrode structure 325 is shown as being a single electrode, additional patterning steps could be used during the formation of the initial stack to define different layers of oxide and nitride and/or silicon so that the removal of the thin pad oxide layer 302 exposes a plurality of silicon regions in the substrate 301 that are separated by nitride and/or oxide regions. For example, the substrate 301 could be covered with oxide layers having different thicknesses, including a thin oxide layer (where the bottom electrode is to be formed) and a thicker oxide layer (where the bottom electrode will not be formed). In other embodiments, the separate bottom gate electrodes may be formed by selectively doping the intended bottom electrode regions in the silicon substrate 301 prior to stack formation instead of forming silicide layers 325. Alternatively, shallow trench isolation (STI) regions could be formed in the silicon substrate 301 prior to stack formation to leave silicon regions in the substrate 310 only where the intended bottom electrode regions are located. While these additional processing steps add an extra overlay step to ensure that the waveguides are formed correctly over the future bottom electrodes, the geometries are sufficiently large that this should not be a problem.

As described herein, the lateral deflection of the MEMS optical beam waveguide 328, 304, 314 is caused by the electric fields that result from the application of the deflection bias voltages to the cantilevered silicon beam 328 and one or more of the lateral deflection electrodes 305E/323, 305E/324 which laterally push or pull the cantilevered silicon beam 328, depending on the polarity of the applied lateral deflection bias voltages. In similar fashion, vertical deflection of the MEMS optical beam waveguide 328, 304, 314 is caused by the electric fields that result from the application of the deflection bias voltages to the cantilevered silicon beam 328 and one or more of the vertical deflection electrodes (e.g., top electrode structures 318-320 or bottom gate electrode structures 325) which vertically push or pull the cantilevered silicon beam 328, depending on the polarity of the applied vertical deflection bias voltages. By supplying the deflectable MEMS optical beam waveguide with a potential as a first deflection bias voltage, like deflection bias voltages (e.g., both positive or both negative) on a lateral or vertical deflection electrode and the deflectable MEMS optical beam waveguide will repel or push the beam away from the deflection electrode on the cavity wall with the like voltage. Conversely, opposite deflection bias voltages (e.g., opposite polarity voltages) on a lateral or vertical deflection electrode and the deflectable MEMS optical beam waveguide will pull or attract the beam toward the deflection electrode on the cavity wall with the opposite potential to that of the beam. From a circuit point of view, it is efficient to selectively supply only positive deflection bias voltages to the deflectable MEMS optical beam waveguide and on one or more deflection electrodes on the cavity wall(s) opposite the desired direction(s) of deflection, though any desired bias voltage polarity scheme may be used to achieve the desired deflection control. For example, with selected multi-electrode embodiments, a negative deflection bias voltage may be applied to a deflection electrode on one side opposite the direction of desired deflection and nearest the base of a positively charged deflectable MEMS optical beam waveguide to reduce the stress that would otherwise be concentrated near the base of the deflectable MEMS optical beam waveguides (by creating a force in the opposite direction to the forces deflecting the beam), thereby distributing the deflection stress more evenly along the beam. In other embodiments, the shape of the deflected beam could be closely controlled by using combinations of positive and negative deflection bias voltages on the deflection electrodes on the same cavity wall. In yet other embodiments, the deflection electrodes on opposite sides of the cavity could be selectively biased so that deflection electrodes on one side of the cavity are biased to attract, while deflection electrodes on the other side of the cavity are biased to repel. This technique could be used to reduce the maximum deflection bias voltage necessary to deflect the beam to address situations the maximum deflection bias voltage is near or above the breakdown voltage of the transistors of electrode voltage generation circuit.

As will be appreciated, the various processing steps used in the fabrication sequence for forming integrated circuit optical MEMS waveguide beams may be performed separately or concurrently with other processing steps used to form other structures in the integrated circuit die. For example, the electrode silicide layer 325 may be formed with silicide formation processing steps that are separate from silicide formation of transistor gate or contact regions. Alternatively, the electrode silicide layer 325 and silicided transistor gate or contact regions may be formed with the same silicide formation processing steps.

To illustrate another example fabrication sequence for forming integrated circuit optical MEMS waveguide beams, reference is now made to FIGS. 18-23 which illustrate partial plan and cutaway side views of various stages in the production of a MEMS optical beam waveguide formed with a semiconductor (e.g., silicon, silicon germanium, etc.) beam structure having top and side metallization electrodes and full waveguide encapsulation and including separate sets of x and y direction electrodes positioned around the MEMS optical beam waveguide that may be independently controlled to provide two-dimensional motion control. Generally speaking, FIGS. 18-23 illustrate processing of the wafer structure subsequent to FIG. 11. Accordingly and for purposes of consistency, the wafer structure features 301-314 from FIG. 11 have been re-labeled as wafer structure features 401-414, respectively, in FIGS. 18-23. However, there is one difference to note concerning the wafer structure processing shown in FIGS. 18-23, which relates to the patterning of the silicon substrate layer 405. In particular, the relatively wider inner openings 309, 310 (shown in FIGS. 9-10) are instead formed with narrower inner openings 409, 410, thereby effectively maintaining the width of the central waveguide beam structure 405B while lengthening the portions 411, 412 of the semiconductor layer 405 that form the lateral electrodes in the final device as described below.

Figure 18:
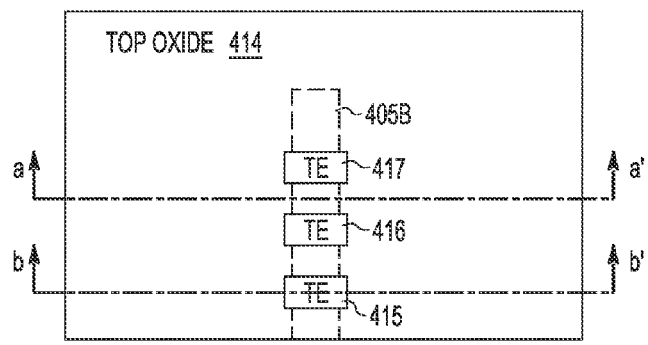
FIGS. 18-23 illustrate partial plan and cutaway side views of various stages in the production of an integrated circuit die including a MEMS optical beam waveguide with multiple deflection electrodes positioned on and around the MEMS optical beam waveguide according to a second example embodiment of the present disclosure.
Figure 19:
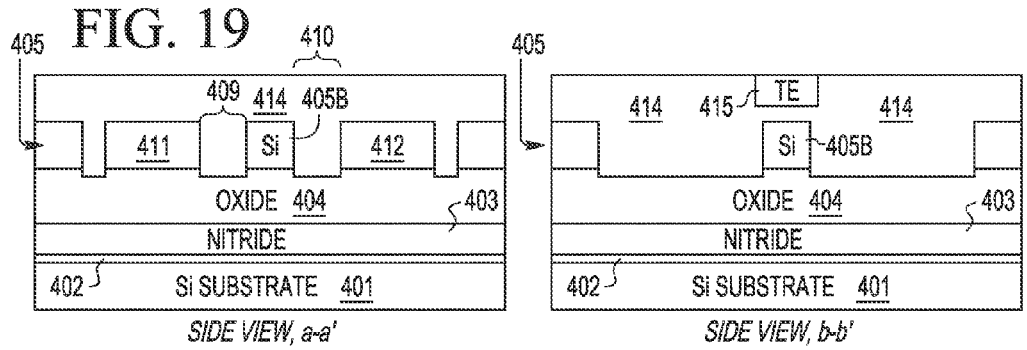

Referring first to FIG. 18, there shown a partial plan view of the processing of the semiconductor wafer structure subsequent to FIG. 11 after a plurality of top electrode (TE) structures 415-417 are formed in the top oxide layer 414 and over the silicon waveguide beam structure 405B. While any desired electrode formation process may be used, the top electrode structures 415-417 may be formed by selectively etching a plurality of etch openings in the top oxide layer 414, such as by patterning a photoresist mask or other masking material (not shown) to selectively etch openings in the top oxide layer 414. Subsequently, a conductive layer, such as polysilicon or metal (e.g., tungsten) or some combination thereof is deposited to fill the etch openings, followed by a planarization or CMP polish step to define the top electrode structures 415-417 over the top oxide layer 414 at specified locations over the central waveguide beam structure 405B. In selected embodiments, the positioning of the top electrode structures 415-417 and finally-formed lateral electrode structures may be staggered or interleaved in a non-overlapping arrangement. This is shown in FIG. 19 with the partial cutaway side view of the semiconductor wafer structure along section views a-a', b-b' after formation of top electrode structures 415-417 so as to be interleaved with the relative position of the finally-formed lateral electrode structures as described below. FIG. 19 also shows that the inner openings 409, 410 used to pattern and define the semiconductor layer 405 result in relatively wider etched semiconductor layer features 411, 412 that are used to form the lateral electrodes in the final device. Of course, it will be appreciated that the top and lateral electrode structures need not be interleaved as shown in FIGS. 18-19.

Figure 20:
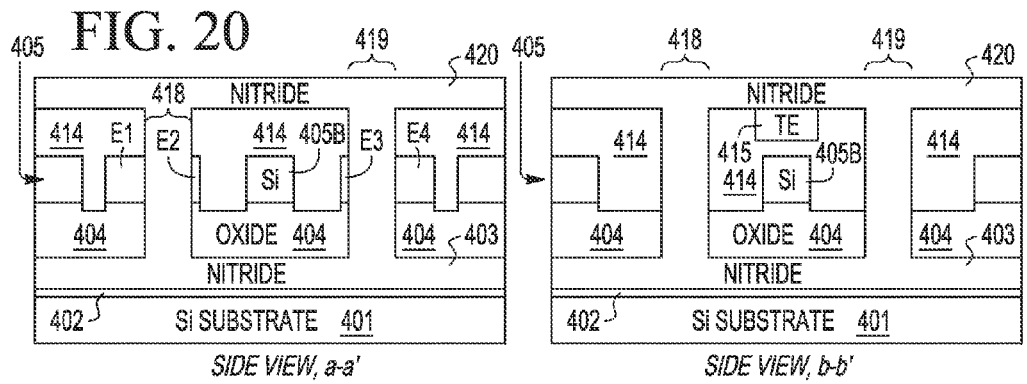

FIG. 20 illustrates processing of the semiconductor wafer structure subsequent to FIG. 19 with the partial cutaway side views a-a', b-b' after portions of the layers 411, 412, 414, 404 have been patterned and etched to form patterned openings 418, 419 on opposite sides of the central waveguide beam structure 405B to selectively expose the underlying nitride layer 403. While any desired pattern and etch process may be used, the etched openings 418-419 may be formed with a photoresist mask or other masking material (not shown) that is patterned, developed, and etched using appropriate anisotropic etch chemistries to protect the top oxide layer 414 and expose the underlying nitride layer 403. In particular, the positioning of the etched openings 418-419 is controlled to divide or separate each of the wider etched semiconductor layer features 411, 412 (where present) into separate semiconductor electrode features E1, E2, E3, E4 as shown, and to create an opening down to the underlying nitride layer 403 for the subsequently formed waveguide beam cavity. In the etched openings 418-419, a silicon nitride layer 420 is formed to cover the wafer structure, such as by using a nitride CVD or thermal deposition process. At this point, the central waveguide beam structure 405B, top electrode structure 415-417, and semiconductor electrode features E2, E3 are completely surrounded by nitride, and the waveguide beam cavity is filled with nitride. After filling the etched openings 418-419 to cover the wafer structure with nitride, the nitride layer 420 may be polished or planarized with a suitable nitride polish process.

Figure 21:
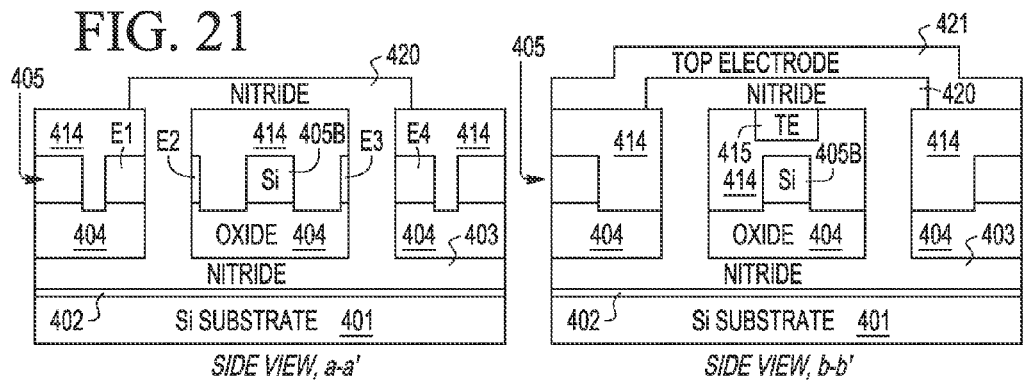

FIG. 21 illustrates processing of the semiconductor wafer structure subsequent to FIG. 20 with a partial cutaway side view after a plurality of top electrode structures (e.g., 421) are formed with a suitable conductive material. While any desired electrode formation process may be used, the top electrode structure(s) 421 may be formed by depositing a conductive layer (e.g., polysilicon or metal or some combination thereof), and then patterning a photoresist mask or other masking material (not shown) to selectively etch the conductive layer to define one or more top electrode structures 421 over the top oxide layer 414 and top nitride layer 420. In selected embodiments, the positioning of the top electrode structure(s) 421 is aligned with the top electrode structure 415-417 and staggered or interleaved with the semiconductor electrode features E2, E3 in a non-overlapping arrangement in order to maximize vertical deflection forces between the top gate electrodes 415, 421. This is shown in FIG. 21 with the partial cutaway side view of the semiconductor wafer structure along section view a-a', where the top electrode structures are not formed over the semiconductor electrode features E1, E2, E3, E4. In contrast, FIG. 21's partial cutaway side view of the semiconductor wafer structure along section view b-b' shows that the top gate electrodes 415, 421 are formed over the central waveguide beam structure 405B in regions where the semiconductor electrode features E1, E2, E3, E4 are not formed. In other embodiments, the top and lateral electrode structures need not be interleaved.

Figure 22:
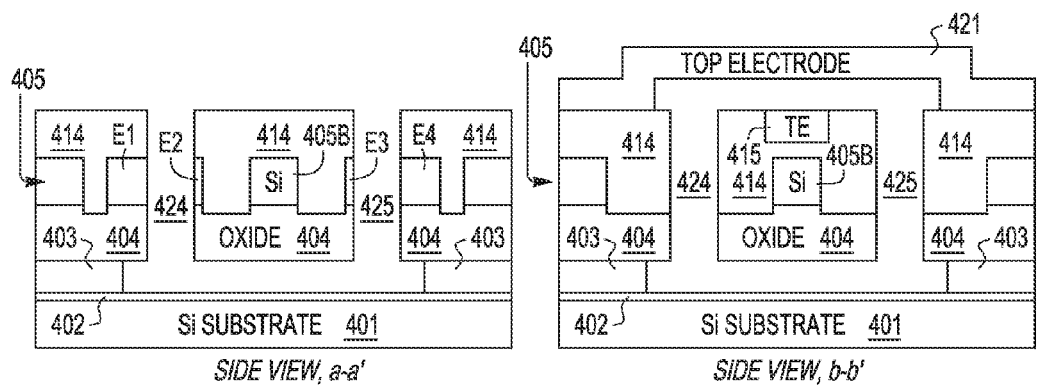

FIG. 22 illustrates processing of the semiconductor wafer structure subsequent to FIG. 21 with a partial cutaway side view after portions of the nitride layers 403, 420 are at least partially etched or removed so that all nitride surrounding the central waveguide beam structure 405B is removed. Any desired etchant process may be used that is capable of selectively removing the nitride layers 403, 420 from the wafer structure in a controlled way. However accomplished, the removal of the nitride layers 403, 420 forms a waveguide beam cavity around the central waveguide beam structure 405B and exposes any adjacent electrode structures E1-E4. This is shown in FIG. 22 with the partial cutaway side view of the semiconductor wafer structure along section views a-a', b-b' after portions of the nitride layers 403, 420 have been removed to form cavity openings 424, 425 on opposite sides of the central waveguide beam structure 405B which also expose the electrode structures E1-E4 (where present).

Figure 23:
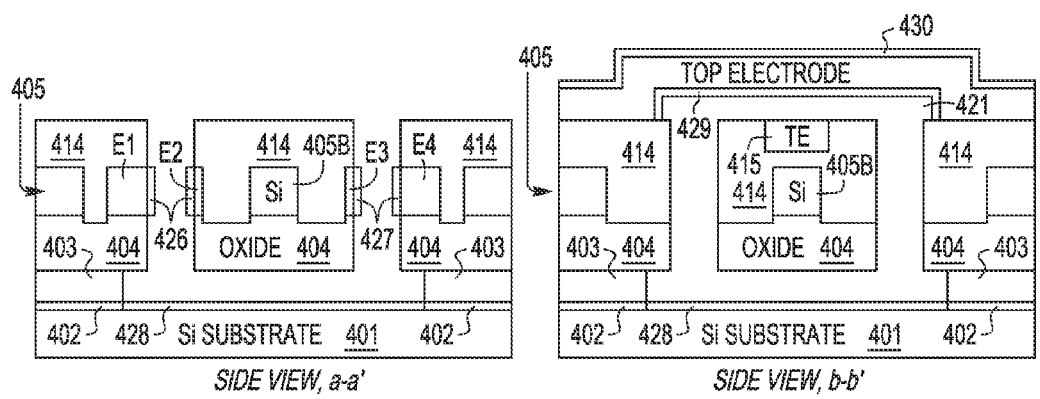

FIG. 23 illustrates processing of the semiconductor wafer structure subsequent to FIG. 22 with the partial cutaway side views a-a', b-b' after silicide layers 426-427, 429-430 are formed on at least the top electrode structures 421 and any exposed electrode structures E1-E4. If desired, one or more bottom gate electrode structures 428 may also be formed below the central waveguide beam structure 405B by (selectively) removing the thin pad oxide layer 402 by applying a suitable etch chemistry in the waveguide beam cavity prior to silicide formation. After the oxide etch, the exposed portions of the top electrode structures 421, electrode structures E1-E4, and silicon substrate 401 are silicided to form silicide layers 426-430 using a suitable material (e.g., tungsten), alone or in combination with a barrier layer (e.g., titanium, tantalum, or nitrides thereof). If the top gate electrode 415 is formed with a metal (e.g., W), a silicide layer will not be formed, as shown in FIG. 23. This resulting silicide electrodes are shown in FIG. 23 with the partial cutaway side view of the semiconductor wafer structure along section views a-a', b-b' in which the top electrode structure 421 includes silicide layers 429-430 and the electrode structures E1-E4 include silicide layers 426, 427. In addition, the bottom electrode(s) may be formed with the bottom electrode silicide layer 428.

To illustrate another example fabrication sequence for forming integrated circuit optical MEMS waveguide beams, reference is now made to FIGS. 24-31 which illustrate partial plan and cutaway side views of various stages in the production of a MEMS optical beam waveguide formed with a silicon oxide ($SiO_2$) beam structure having top, bottom, and side metallization electrodes and full waveguide encapsulation and including separate sets of x and y direction electrodes positioned around the MEMS optical beam waveguide that may be independently controlled to provide two-dimensional motion control.

Figure 24:
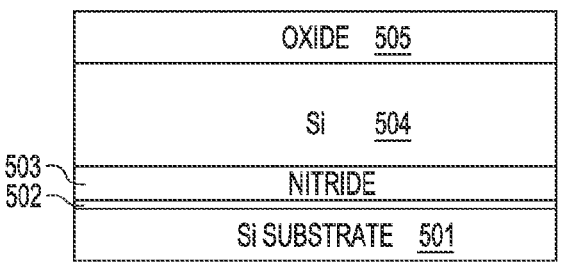
FIGS. 24-31 illustrate partial plan and cutaway side views of various stages in the production of an integrated circuit die including a MEMS optical beam waveguide with multiple deflection electrodes positioned on and around the MEMS optical beam waveguide according to a third example embodiment of the present disclosure.

Referring first to FIG. 24, there is shown a partial cutaway side view of a semiconductor wafer structure formed as a starting stack with a plurality of substrate layers 501-505. In selected embodiments, the wafer structure includes a bulk silicon substrate 501 formed with monocrystalline silicon, though other materials may be used. On the substrate layer 501, a thin oxide layer or pad oxide layer 502 may be formed by depositing or thermally growing silicon oxide to a predetermined thickness (e.g., approximately 1-50 nm), though other materials and thicknesses could be used. On the pad oxide layer 502, a silicon nitride layer 503 and silicon substrate layer 504 are sequentially formed on the wafer structure. In selected embodiments, the nitride layer 503 is deposited by a CVD or thermal deposition process to a predetermined thickness (e.g., 1000 nm or other suitable thickness for forming the cavity during later formation steps) which is controlled to define part of the subsequently formed waveguide beam cavity. In addition, the silicon substrate layer 504 may be formed by epitaxially growing monocrystalline silicon or depositing polysilicon using any desired CVD or thermal deposition process, alone or in combination with a planarization or polish step. The silicon substrate layer 504 is formed to a predetermined thickness (e.g., 1000 nm or other suitable thickness for encapsulating the waveguide) which is controlled to define the subsequently formed encapsulating waveguide structure around the silicon oxide optical beam structure. On the silicon substrate layer 504, an oxide layer 505 is formed to a predetermined thickness (e.g., 1000 nm or other suitable thickness for forming the waveguide) using a CVD or thermal deposition process, alone or in combination with a planarization or polish step. As will be appreciated, the starting stack of substrate layers 501-505 may be formed by bonding the silicon substrate layer 504 to the underlying substrate layer 501 to include the pad oxide layer 502 and nitride layer 503.

Figure 25:
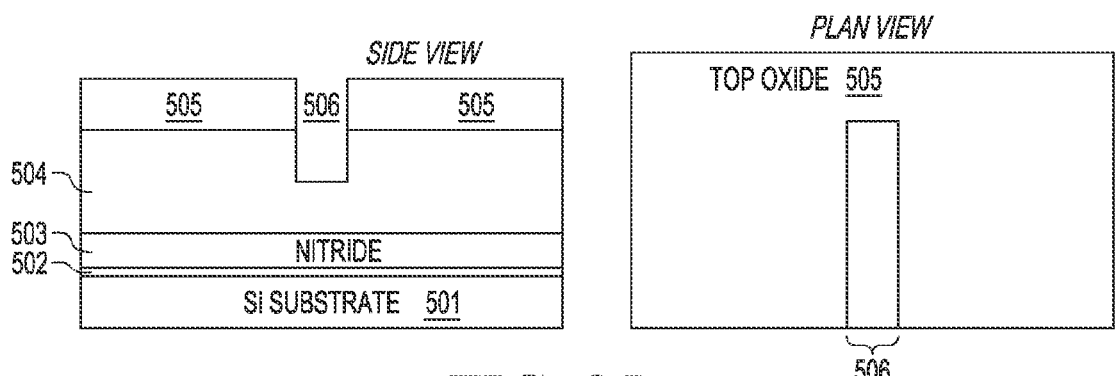

FIG. 25 illustrates processing of the semiconductor wafer structure subsequent to FIG. 24 with partial cutaway and plan views after portions of the layers 504-505 have been patterned and etched to form a patterned opening 506 which defines a recess in the silicon substrate layer 504 where the optical beam structure will be formed. The dimensions of the patterned opening 506 may be controlled to define the width and length of the optical beam structure. While any desired pattern and etch process may be used, the patterned opening 506 may be formed with a photoresist mask or other masking material (not shown) that is patterned, developed, and etched using appropriate anisotropic etch chemistries to protect the top oxide layer 505 and etch into the underlying silicon substrate layer 504 where the patterned opening 506 is formed.

Figure 26:
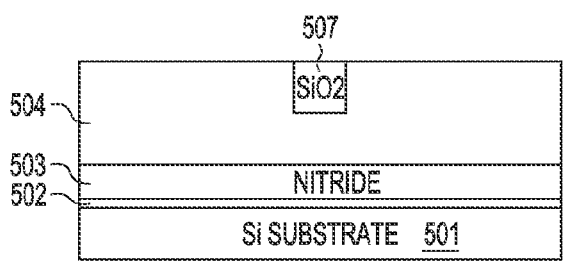

FIG. 26 illustrates processing of the semiconductor wafer structure subsequent to FIG. 25 with a partial cutaway side view after an optical beam structure 507 is formed in the patterned opening 506 by depositing and polishing a dielectric layer. In selected embodiments, the optical beam structure 507 may be formed by depositing a dielectric layer (e.g., $SiO_2$) over the wafer structure and then subsequently planarizing or polishing the wafer structure down to the silicon substrate layer 504. While silicon oxide can be used to form the optical beam structure 507, any desired material can be used that provides suitable light transmission properties for the optical signal transmission.

Figure 27:
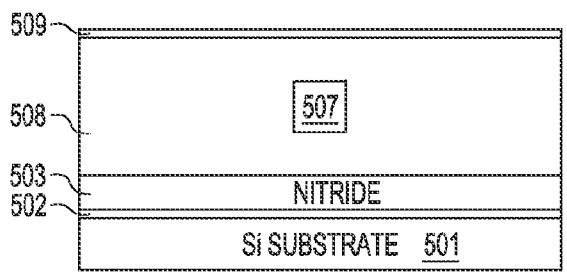

FIG. 27 illustrates processing of the semiconductor wafer structure subsequent to FIG. 26 with a partial cutaway side view after an additional silicon waveguide layer 508 and thin oxide layer or pad oxide layer 509 are sequentially formed. In selected embodiments, the silicon substrate layer 508 may be formed by epitaxially growing monocrystalline silicon or depositing polysilicon on top of the polished silicon substrate layer 504 using any desired deposition or growth process to a predetermined thickness (e.g., 1000 nm or other suitable thickness for encapsulating the waveguide) which is controlled to define the subsequently formed encapsulating waveguide structure. If desired, the newly formed silicon waveguide layer 508 may be polished or planarized. Subsequently, the pad oxide layer 509 may be formed by depositing or thermally growing silicon oxide to a predetermined thickness (e.g., approximately 1-50 nm), though other materials and thicknesses could be used. As will be appreciated, the pad oxide layer 509 provides a good adhesion surface for the subsequently formed nitride layer 512.

Figure 28:
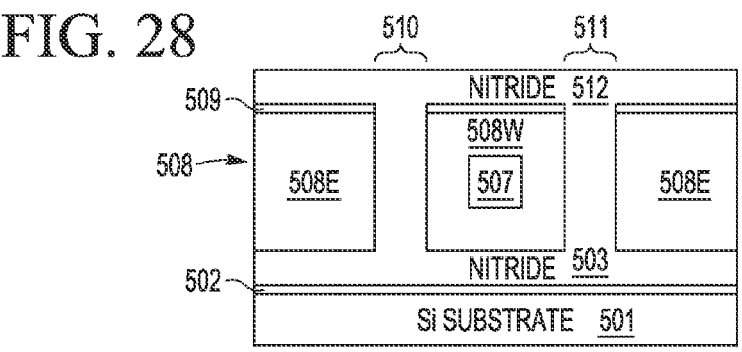

FIG. 28 illustrates processing of the semiconductor wafer structure subsequent to FIG. 27 with a partial cutaway side view after portions of the layers 508, 509 have been patterned and etched to form patterned openings 510, 511 to selectively expose the underlying nitride layer 503 to thereby define the optical beam structure 507 surrounded by an encapsulating silicon waveguide structure 508W. The location and dimensions of the etch openings 510, 511 may be controlled to define left and right electrode structures 508E and a central encapsulating oxide waveguide structure 508W. While any desired pattern and etch process may be used, the etched openings 510, 511 may be formed with a photoresist mask or other masking material (not shown) that is patterned, developed, and etched using appropriate anisotropic etch chemistries to protect the layers 508, 509 and expose the underlying nitride layer 503 where desired. In particular, the etched openings 510, 511 create an opening down to the underlying nitride layer 503 for the subsequently formed waveguide beam cavity. In the etched openings 510, 511 and over the etched silicon structures 508E, 508W, a silicon nitride layer 512 is formed to cover the wafer structure, such as by using a nitride CVD or thermal nitride process. At this point, the encapsulating silicon waveguide structure 508W surrounding the central waveguide beam structure 507 is completely surrounded by nitride layers 503, 512, thereby filling the waveguide beam cavity with nitride. After filling the etched openings 510, 511 to cover the wafer structure with nitride, the nitride layer 512 may be polished or planarized with a suitable nitride polish process. In other embodiments, the exposed sidewalls of the etched silicon structures 508E, 508W in the etched openings 510, 511 may be oxidize or coated with oxide prior to filling the openings with nitride.

Figure 29:
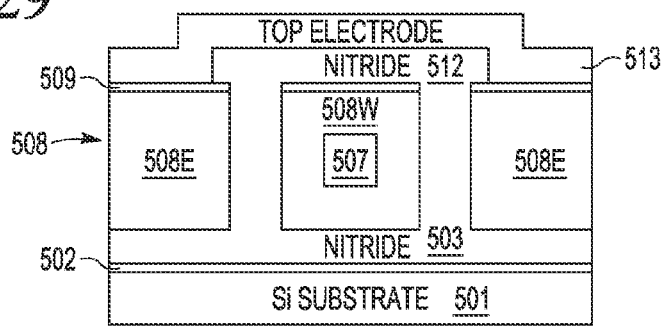

FIG. 29 illustrates a partial plan view of the processing of the semiconductor wafer structure subsequent to FIG. 28 after the removing the nitride layer 512 from areas outside the optical beam waveguide area, and then forming one or more top electrode structures 513 over the optical beam waveguide area with a suitable conductive material. As will be appreciated, the nitride layer 512 may be selectively removed using any desired pattern and etch process to protect the optical beam waveguide area and otherwise remove the nitride layer 512. As for the top electrode structure(s) 513, any desired electrode formation process may be used, such as depositing a conductive layer (e.g., polysilicon or metal or some combination thereof), and then patterning a photoresist mask or other masking material (not shown) to selectively etch the conductive layer to define the top electrode structure(s) 513 over the pad oxide layer 509 and top nitride layer 512. In selected embodiments, the positioning of the top electrode structure(s) 513 and electrode structures 508E may be staggered or interleaved in a non-overlapping arrangement. In other embodiments, the top and lateral electrode structures need not be interleaved.

Figure 30:
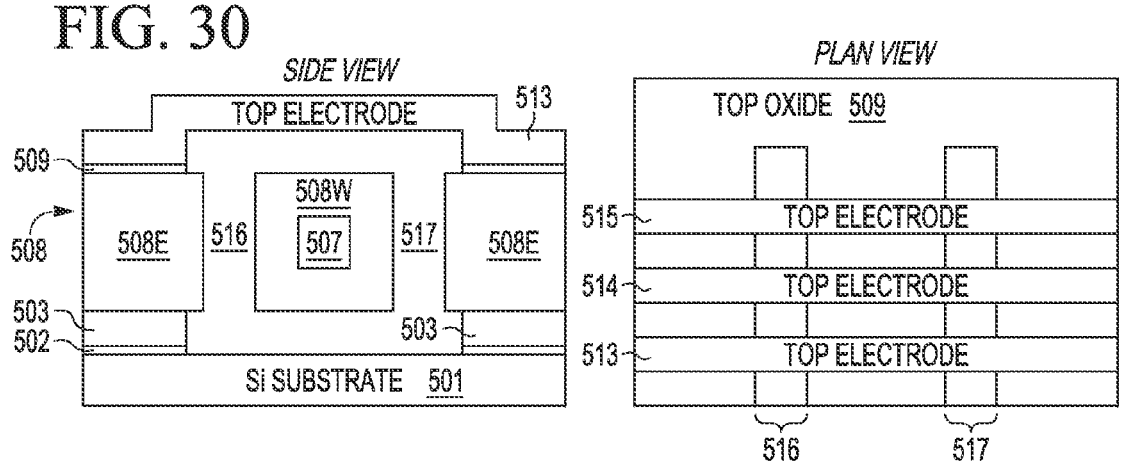

FIG. 30 illustrates processing of the semiconductor wafer structure subsequent to FIG. 29 with partial cutaway and plan views after portions of the nitride layers 503, 512 are at least partially etched or removed, though the entirety of the nitride layers 503, 512 surrounding the encapsulating silicon waveguide structure 508W is removed. Any desired etchant process may be used that is capable of selectively removing the nitride layers 503, 512 from the wafer structure in a controlled way. For example, the nitride layers 503, 512 may be etched down to the pad oxide layer 502, preferably by using a wet etch chemistry (e.g., phosphoric acid) that is selective to the exposed dielectric material layers 502, 509 and any exposed silicon layers 508. However, it will be appreciated that other techniques can be used to avoid using a controlled etch process to selectively remove the nitride layers 503, 512. However accomplished, the removal of the nitride layers 503, 512 forms a waveguide beam cavity around the encapsulating silicon waveguide structure 508W and exposes any adjacent electrode structures 508E. In selected embodiments, an additional oxide etch process may be applied to remove the pad oxide layer 502 from the bottom of the waveguide beam cavity. This is shown in FIG. 30 with the partial cutaway side view of the semiconductor wafer structure after portions of the nitride layers 503, 512 and pad oxide layer 502 have been removed to form cavity openings 516, 517 on opposite sides of the encapsulating silicon waveguide structure 508W which also expose the electrode structures 508E (where present). In addition, the plan view of FIG. 30 shows that the cavity openings 516, 517 expose the underlying silicon substrate layer 501.

Figure 31:
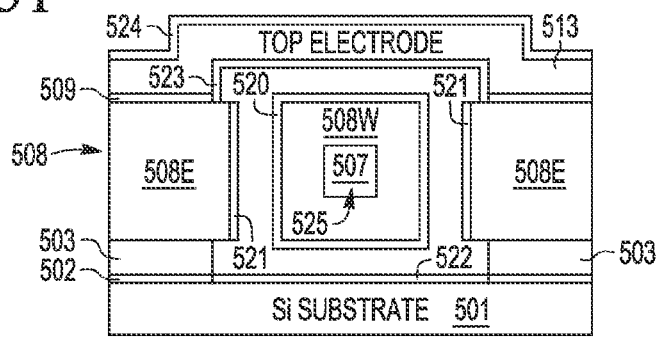

FIG. 31 illustrates processing of the semiconductor wafer structure subsequent to FIG. 30 with the partial cutaway side view after silicide layers 520-521, 523-524 are formed on at least the top electrode structures 513-515 and any exposed electrode structures 508E using a silicide formation process. If desired, one or more bottom gate electrode structures 522 may also be formed below the central waveguide beam structure 508W during silicide formation. For example, the exposed portions of the top electrode structures 513-515, encapsulating silicon waveguide structure 508W, side electrode structures 508E, and silicon substrate 501 may be silicided to form silicide layers 520-524 using a suitable material (e.g., tungsten), alone or in combination with a barrier layer (e.g., titanium, tantalum, or nitrides thereof). This resulting silicide electrodes are shown in FIG. 31 with the partial cutaway side view of the semiconductor wafer structure in which the top electrode structure 513 includes silicide layers 523-524, the encapsulating silicon waveguide structure 508W includes silicide layers 520, and the electrode structures 508W include silicide layers 521. In addition, the bottom electrode(s) may be formed with the bottom electrode silicide layer 522.

Figure 32:
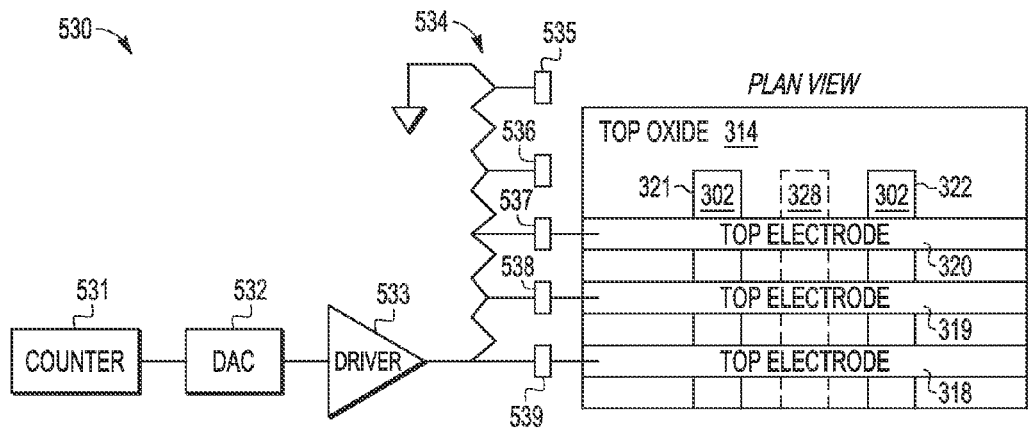
FIG. 32 illustrates an example circuit diagram of a bias driver for generating separate deflection bias voltages for a plurality of different deflection electrodes for a MEMS optical beam waveguide.

By providing a MEMS optical beam waveguide with multiple deflection electrodes positioned on and around the length of the waveguide, each deflection electrode may be connected to a separate bias voltage to provide different amounts of deflection along the optical beam path. In selected embodiments, larger voltages may be applied to deflection electrodes that are located further from the connection of the optical beam waveguide to the supporting substrate, thereby increasing the deflection along the beam path. An example implementation is illustrated in FIG. 32 which shows circuit diagram for a multiple electrode bias driver 530 that generates separate deflection bias voltages for a plurality of top electrodes 318-320 in the optical MEMS waveguide beam shown in plan view in FIG. 17. As illustrated, the bias driver 530 may be digitally programmed to generate a specified voltage at the output of a voltage driver circuit 533 by storing a digital voltage value at the counter 531 which is an up-down counter controlled by feedback, converting the digital voltage value at the digital-to-analog converter (DAC) 532, and supplying the converted value to the voltage driver circuit 533 which generates a drive voltage. In some embodiments the counter 531 and the voltage driver circuit 533 may be considered to be components of the DAC 532. By applying generated drive voltage to a multi-tap resistor circuit 534 which has individual taps 537-539 connected to different deflection electrodes 318-320, each top electrode is biased with a different deflection voltage. For example, a first top electrode 318 (which is located furthest from the connection of the optical beam waveguide 328 to the supporting substrate) is connected to a first tap 539 to receive the largest deflection voltage (e.g., the drive voltage generated by the voltage driver circuit 533). The next top electrode 319 (which is located closer to the connection of the optical beam waveguide 328 to the supporting substrate) is connected to a second tap 538 to receive a second, smaller deflection voltage (e.g., the drive voltage generated by the voltage driver circuit 533, reduced by the first voltage drop across the multi-tap resistor circuit 534). The next top electrode 320 (which is located closest to the connection of the optical beam waveguide 328 to the supporting substrate) is connected to a third tap 537 to receive a third, smallest deflection voltage (e.g., the drive voltage generated by the voltage driver circuit 533, reduced by the first and second voltage drops across the multi-tap resistor circuit 534). In this way, the deflection voltages supplied to the top electrodes 318-320 decrease from the drive voltage generated by the voltage driver circuit 533 (e.g., at tap 539 and electrode 318) down toward a reference voltage (e.g., ground) at the multi-tap resistor circuit 534. As will be appreciated, the bias driver 530 may supply different deflection bias voltages by including additional taps (e.g., 535-536) in the multi-tap resistor circuit 534 which are connected as required to the plurality of top electrodes 318-320. Indeed, depending on how each tap 535-539 is connected to the different deflection electrodes 318-320, each electrode may be provided any desired deflection bias voltage.

Figure 33:
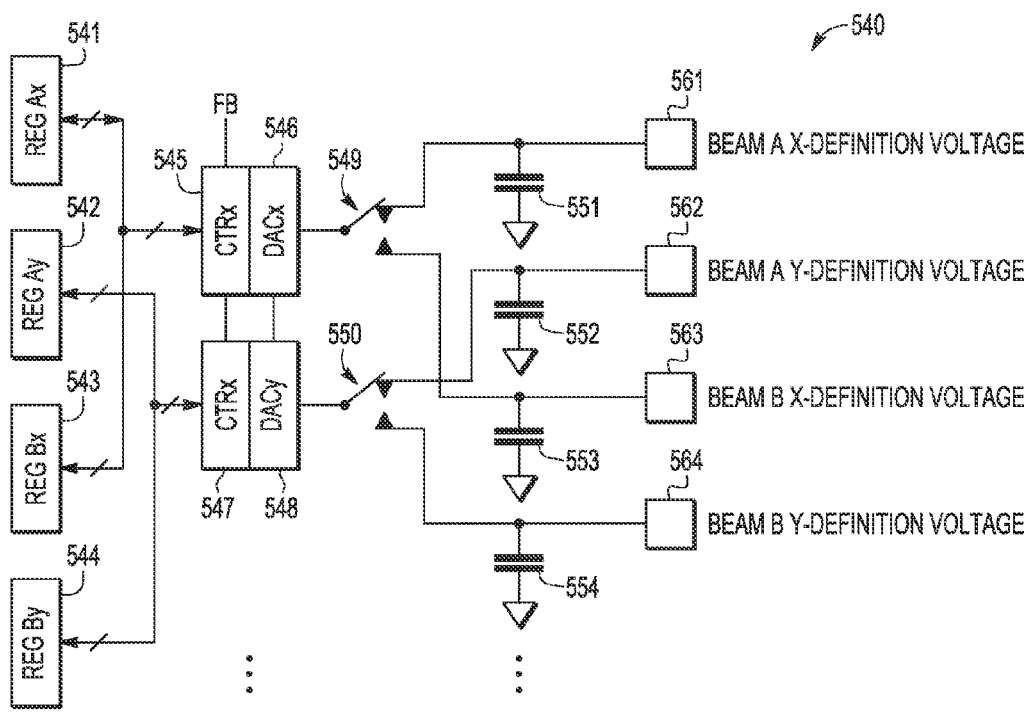
FIG. 33 illustrates an example circuit diagram of a bias driver for generating MEMS beam plate voltages for vertical and lateral deflection electrodes for a MEMS optical beam waveguide.

As will be appreciated, other deflection bias voltage generators may be used to separately control the different deflection electrodes positioned on and around the length of the waveguide driver. The ability to separately control the applied deflection bias voltages can reduce the risk of stress fractures at the base of the MEMS waveguide beam structure by applying deflection voltages to at least a first electrode at the base of the MEMS waveguide beam structure having the opposite polarity to the deflection voltages applied to the electrodes at the end of the MEMS waveguide beam structure. Referring now to FIG. 33, there is illustrated an example circuit diagram for a shared bias driver 540 that generates separate deflection bias voltages for vertical and lateral deflection electrodes positioned around one or more optical MEMS waveguide beams.

The depicted shared bias driver circuit 540 may be used to control multiple MEMS waveguide beam structures to program compensation for a beam offset resulting from stresses induced during manufacturing. In operation, the bias driver 540 may be digitally programmed to generate a plurality of specified deflection voltages at nodes 561-564 which are coupled to top and side deflection electrodes (not shown). For example, the bias driver 540 generates a first lateral or X-deflection voltage at charging capacitor 551 for a first MEMS optical beam waveguide (Beam A) at a first node 561, and generates a second lateral or X-deflection voltage at charging capacitor 553 for a second MEMS waveguide beam (Beam B) at a second node 563. In addition, the bias driver 540 generates a first vertical or Y-deflection voltage at charging capacitor 552 for the first MEMS waveguide beam (Beam A) at a third node 562, and a second vertical or Y-deflection voltage at charging capacitor 554 for the second MEMS waveguide beam (Beam B) at a fourth node 564, and so on.

To generate the lateral or X-deflection voltages, the shared bias driver circuit 540 includes a plurality of digital counters or registers for storing lateral digital voltage values. For example, a first lateral digital voltage value (Ax) for the first MEMS waveguide beam is stored at register/counter 541 by control logic 545, and a second lateral digital voltage value (Bx) for the second MEMS optical beam waveguide is stored at register/counter 543 by control logic 545. With the applicable control logic 545, the stored lateral digital voltage values from registers 541, 543 are converted at DAC circuit 546 to first and second lateral or X-deflection voltages, respectively, which are supplied by control switch 549 to first and second nodes 561, 563. Though not shown, the first lateral or X-deflection voltage at node 561 may be supplied to lateral deflection electrodes at a first MEMS optical waveguide beam (Beam A) and the second lateral or X-deflection voltage at node 563 may be supplied to lateral deflection electrodes at a second MEMS optical waveguide beam (Beam B).

In similar fashion, the shared bias driver circuit 540 generates the vertical or Y-deflection voltages from vertical digital voltage values that are stored in a plurality of digital counters or registers. For example, a first vertical digital voltage value (Ay) for the first MEMS optical beam waveguide is stored at register/counter 542 by control logic 547, and a second vertical digital voltage value (By) for the second MEMS optical beam waveguide is stored at register/counter 544 by control logic 547. With the applicable control logic 547, the stored lateral digital voltage values from registers 542, 544 are converted at DAC circuit 548 to first and second vertical or Y-deflection voltages, respectively, which are supplied by control switch 550 to third and fourth nodes 562, 564. Though not shown, the first vertical or Y-deflection voltage at node 562 may be supplied to a top (and/or bottom) deflection electrode at a MEMS optical beam waveguide (Beam A), and the second vertical or Y-deflection voltage at node 564 may be supplied to a top (and/or bottom) deflection electrode at a second MEMS optical beam waveguide (Beam B).

By generating different vertical and lateral deflection voltages from digital voltage values stored in dedicated control registers 541-544 using control logic in a shared circuit arrangement 540, each of the separate top and side electrodes may be separately biased with any arbitrary deflection voltage. In this way, the deflection voltages supplied to the top and side electrodes may be increased or decreased along the length of the respective MEMS beam waveguide. Alternatively, the bias driver 540 may supply different deflection bias voltages to reduce the risk of stress fractures at the base of the MEMS optical waveguide beam structure by applying a deflection voltage to at least a first electrode at the base of the MEMS waveguide beam structure that has an opposite polarity to the deflection voltages applied to the electrodes at the end of the MEMS optical beam waveguide structure.

With the shared circuit arrangement 540, such as shown in FIG. 33, there is provided a method for generating MEMS optical beam waveguide plate voltages at each MEMS optical waveguide beam that can be individually applied to different deflection electrodes to provide feedback-based compensation for beam offset adjustments that arise from stresses induced during manufacturing and/or during operation. As a preliminary step, a pair of DAC counters for a beam (e.g., Beam A) are calibrated with initial setting values to compensate for beam deflections in the X and Y directions resulting from manufacturing stresses or defects, thereby zeroing the beam deflection. The initial calibration step can be performed at fabrication or during test operations, and the resulting X and Y calibration values can be stored, such as by programming fuse values or flash memory values. Using control logic, values representing the expected beam deflection angles, based on the calculated relative physical location of the MEMS optical beam waveguide coupled to the receiver in a target die in the adjacent stack, are calculated (or retrieved from memory), and then added to the stored X and Y calibration values to compute final X and Y deflection values that may be stored or loaded in a pair of X and Y deflection control registers (e.g., 541, 542) for the MEMS optical waveguide beam. The final X and Y deflection values for the beam may then be loaded from the registers (e.g., 541, 542) into respective DAC circuits 546, 548 via control logic 545, 547, where they are converted to X and Y MEMS beam plate voltages that are respectively stored on the capacitors 551, 552 via control switches 549, 550. After loading the stored values for processing by the DAC circuit 546, 548 to generate deflection voltages for the X and Y deflection electrodes, the corresponding MEMS optical beam waveguides may be deflected to initial angles in X and Y to approximately align to the associated receiving MEMS optical beam waveguides in a target die in an adjacent stack. A calibration procedure to refine beam alignment may then be initiated. Since no data signal is yet available, an optical beam with a dummy signal may be passed through the calibrating MEMS optical beam waveguide to be received by the target MEMS optical beam waveguide and receiver in the adjacent stack. Feedback electrical signals (FB) from the target MEMS optical beam waveguide and receiver are generated based on the intensity of the received optical beam at the target receiver, and may then be coupled through the connections in the die stacks (e.g., TSVs) and substrate board. Once received, the feedback electrical signals (FB) can be used to by control logic 545, 547 to more accurately adjust the alignment of the calibrating MEMS optical beam waveguide.

Over time, the X and Y MEMS beam plate voltages may be adjusted as required to reflect changes in the beam alignment requirements, such as may be introduced by vibration (e.g., dropping) or temperature changes during use. To this end, an optical signal or an optical dummy signal may periodically be communicated from a transmitting MEMS optical waveguide beam to a corresponding receiving MEMS optical beam waveguide beam to generate feedback (FB) for the control logic 545, 547 for use in (re) calibrating the MEMS optical beam waveguide beams to achieve MEMS optical beam waveguide alignment. In response to the feedback signal, the control logic 545, 547 adjusts the DAC counter values and/or otherwise updates the values stored in the pair of X and Y deflection control registers (e.g., 541, 542) for the beam. In this way, the control logic 545, 547 can retrieve and use the adjusted final X and Y deflection values from the X and Y deflection control registers during the next beam alignment/capacitor restore cycle.

Figure 34:
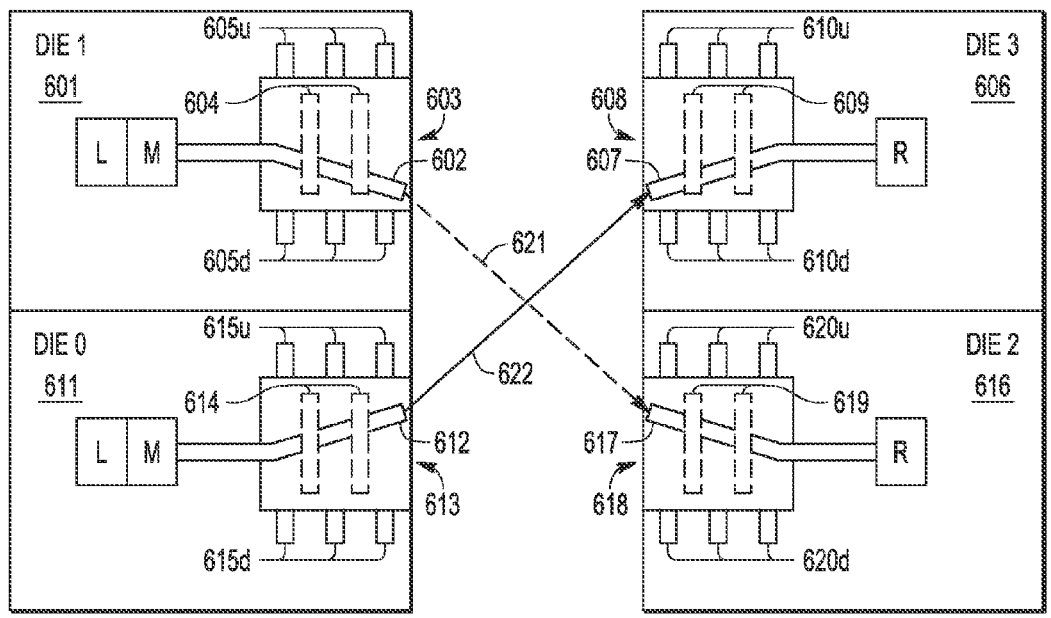
FIG. 34 illustrates a first application for MEMS optical beams with two-dimensional deflection to communicate between two die without external deflection.

As described hereinabove, there is provided an improved MEMS optical beam waveguides with enclosed sides to limit light dispersion and with two-dimensional alignment and controlled feedback to adjust beam alignment to make the integration of the die-to-die optical communication easier. While the MEMS optical beam waveguides and surrounding electrode structures may be used in a controlled feedback system as part of an information handling system, it will be appreciated that the controllable optical beam waveguides may be used with any embodiments where controlled movement of an optical beam waveguide is desired, such as sensor communication systems, automotive sensor and control systems, etc. A first example application is illustrated in FIG. 34 which shows how MEMS optical beams with two-dimensional beam alignment can be used in a stacked die assembly to communicate between two die without external deflection. It should be understood that that, in some embodiments using bidirectional communications over an optical link between two die, there is a MEMS optical waveguide beam at each end of the link so that a transmitting beam is aligned to a target MEMS optical beam waveguide beam and receiver in both directions. In these embodiments, the link alignment includes beams at both ends of the link to be aligned as described above. For unidirectional communications, aligning the receiving MEMS optical waveguide beam presents a receiving waveguide face perpendicular to the beam reducing beam dispersion.

Reference is now made to FIG. 34 which shows transmitting and receiving MEMS optical beam waveguide beam in adjacent die stacks and the optical signals communicated between them. On the left, two stacked die 601, 611 each include a light or laser source (L) for generating an unmodulated optical beam, and a modulator (M) for generating a modulated light beam for transmission through the respective MEMS optical beam waveguide 602, 612. In addition, each of the stacked die 601, 611 includes an MEMS optical beam waveguide 602, 612 which may be deflected within a cavity 603, 613 by application of one or more deflection bias voltages to the deflection electrodes 605, 615 positioned around each cavity 603, 613. Each of the stacked die 601, 611 may include one or more additional deflection electrodes 604, 614 which are positioned around each cavity 603, 613 to provide an additional dimension of beam alignment control. In similar fashion, there are two stacked die 606, 616 on the right which each include an MEMS optical beam waveguide 607, 617 which may be deflected within a cavity 608, 618 by application of one or more deflection bias voltages to the deflection electrodes 610, 620 and one or more additional deflection electrodes 609, 619 positioned around each cavity 608, 618. Each of the stacked die 606, 616 includes a receiver (R) for receiving and demodulating the optical beam signal received through the respective MEMS optical beam waveguide 607, 617.

By generating and applying the proper deflection bias voltages to the upper and lower deflection electrodes $605u$, $605d$ at die 601, the MEMS optical beam waveguide 602 is deflected within the cavity 603 to point down toward die 616, thereby directing the optical signal 621 from the MEMS optical beam waveguide 602. At the receiving die 616, the appropriate deflection bias voltages are applied to the upper and lower deflection electrodes 620*u*, 620*d* to deflect the MEMS optical beam waveguide 617 to be aligned for reception of the optical signal 621. In this way, the multiple deflection electrodes 604-605, 619-620 positioned on and around the MEMS optical beam waveguides 602, 617 may be used to provide two-dimensional deflection for aligning communications between two die without external deflection along with controlled feedback to adjust beam alignment as described hereinabove.

Figure 35:
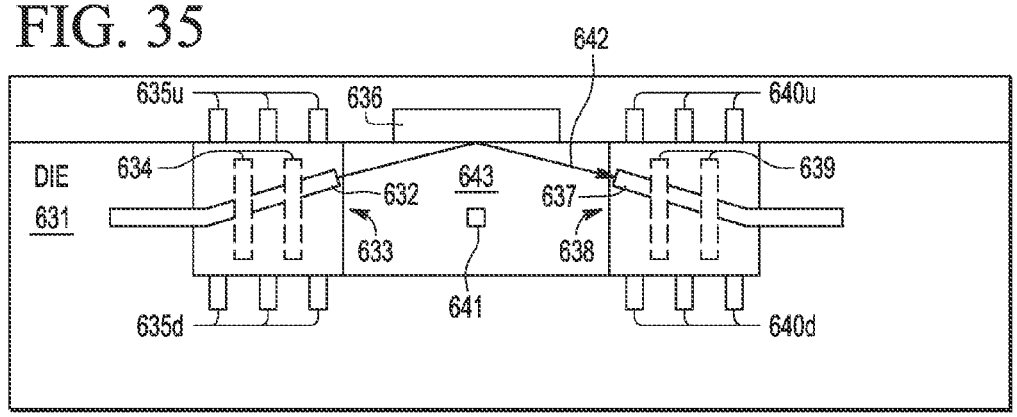
FIG. 35 illustrates a second application for MEMS optical beams with two-dimensional deflection to provide optical waveguide crossover within a die.

In similar fashion, deflection bias voltages may be applied to the upper and lower deflection electrodes 615*u*, 615*d* at die 611 to deflect the MEMS optical beam waveguide 632 within the cavity 633 to point down toward die 606, thereby directing the optical signal 622 from the MEMS optical beam waveguide 612. At the receiving die 606, the appropriate deflection bias voltages are applied to the upper and lower deflection electrodes 610*u*, 610*d* to deflect the MEMS optical beam waveguide 607 to be aligned for reception of the optical signal 622. In this way, the multiple deflection electrodes 614-615, 609-610 positioned on and around the MEMS optical beam waveguides 612, 607 may be used to provide two-dimensional deflection for aligning communications between two die without external deflection along with controlled feedback to adjust beam alignment. Once alignment of MEMS optical beam waveguide pairs 602, 617 and 612, 607 is achieved, each MEMS optical beam waveguide is capable of bidirectional communication. In addition to facilitating die-to-die signal connections, other applications are possible with the improved MEMS optical beam waveguides disclosed herein. For example, the MEMS optical beam waveguides can be used internally within a die to provide an optical waveguide crossover communication path as between potentially conflicting structures within the optical waveguide plane. An example crossover application is illustrated in FIG. 35 which shows how MEMS optical beams with two-dimensional beam deflection can be used to provide an optical waveguide crossover path within a die 631. As depicted, the die 631 includes a pair of MEMS optical beam waveguides 632, 637 which, if un-deflected, would communicate optical signals that interact with the optical structure 641 (e.g., a laser cavity, a modulator, etc.) in the same plane (but aligned perpendicular to the page), possibly leading to signal degradation. Instead of using fixed waveguide/mirror arrangements (with their associated cost and complexity) to route the waveguides past each other, the pair of MEMS optical beam waveguides 632, 637 are positioned around an intersection cavity 643 having a reflection surface layer 636 to reflect the optical signal 642 from the MEMS optical beam waveguide 632 to the MEMS optical beam waveguide 637.

To accomplish crossover signal routing, the pair of MEMS optical beam waveguides 632, 637 are disposed on opposite sides of the intersection cavity 643 so that the MEMS optical beam waveguides 632, 637 may be deflected within their respective cavities 633, 638 by application of one or more deflection bias voltages to the deflection electrodes 634-635, 639-640 positioned around each cavity 633, 638. By appropriate control of the pattern and etch processes applied to the conductor layer (e.g., the metal 1 (M1) layer), the deflection electrodes 635*u*, 640*u* and reflection surface layer 636 may be formed from the same material layer, provided that the position and width of the reflection surface layer 636 are chosen to provide the required reflection of the optical signal 642. In operation, deflection bias voltages are applied to the upper and lower deflection electrodes 635*u*, 635*d* to deflect the MEMS optical beam waveguide 632 within the cavity 633 to point up toward the reflection surface layer 636, thereby directing the optical signal 642 from the MEMS optical beam waveguide 632 to be reflected back toward the MEMS optical beam waveguide 637. Likewise, appropriate deflection bias voltages are applied to the upper and lower deflection electrodes 640*u*, 640*d* to deflect the MEMS optical beam waveguide 637 to be aligned for reception of the reflected optical signal 642. In this way, the multiple deflection electrodes 634-635, 639-640 positioned on and around the MEMS optical beam waveguides 632, 637 may be used to provide two-dimensional deflection for building an optical waveguide crossover using the same technology as an ordinary beam switch. To prevent signal degradation from optical signal interaction with the waveguide 641, the MEMS optical beam waveguides 632, 637 are always in a deflected position when the waveguides are functional.

In addition to crossover signal routing, the pair of MEMS optical beam waveguides 632, 637 may be disposed to selectively switch signals to and from the waveguide 641. For example, if the waveguide 641 includes a deflection mirror structure (e.g., a 45 degree mirror for perpendicularly deflecting optical signals), one or more of the MEMS optical beam waveguides 632, 637 may be deflected by application of appropriate deflection bias voltages at the deflection electrodes to deflect the MEMS optical beam waveguide (e.g., 632) to point toward the deflection mirror structure (not shown) in the waveguide 641, thereby perpendicularly deflecting the transmitted optical signal. Similarly, an optical signal transmitted from the deflection mirror structure (not shown) in the waveguide 641 may be received at a MEMS optical beam waveguide by applying appropriate deflection bias voltages at the deflection electrodes to deflect the MEMS optical beam waveguide (e.g., 637) to point toward the deflection mirror structure (not shown) in the waveguide 641.

Figure 36:
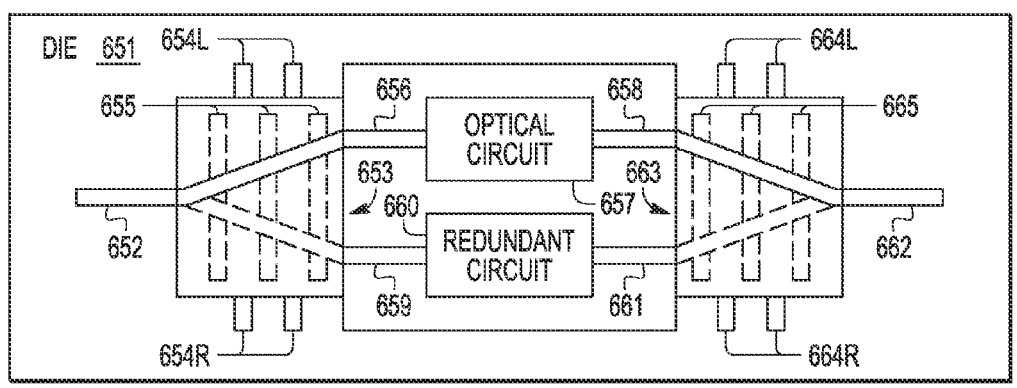
FIG. 36 illustrates a third application for MEMS optical beams with two-dimensional deflection to provide optical redundancy within a die.

The MEMS optical beam waveguides disclosed herein may also be used for other switching-related applications for internal die signal connections and/or die-to-die signal connections. For example, the MEMS optical beam waveguides can be used to provide optical redundancy switch functionality within a die to deselect defective optical/circuit elements and replace them with spare optical/circuit elements. An example optical redundancy switch application is illustrated in FIG. 36 which shows how a switched pair of MEMS optical beams with two-dimensional beam deflection can be used in a die 651 to provide an optical signal path to a redundant circuit 660 to replace a defective optical circuit component 657 in the signal path. As depicted, the die 651 includes a pair of MEMS optical beam waveguides 652, 662 which are disposed on opposite sides of a pair of optical circuits 657, 660 so that the pair of MEMS optical beam waveguides 652, 662 may be deflected within their respective cavities 653, 663 by application of one or more deflection bias voltages to the deflection electrodes 654-655, 664-665 positioned around each cavity 653, 663. By applying the appropriate deflection bias voltages to the deflection electrodes 654-655, 664-665, the switched pair of MEMS optical beam waveguides 652, 662 may be deflected in a first position to communicate optical signals to and from a first optical circuit 657 via first optical beams 656, 658 associated with the first optical circuit 657. As described herein, the deflection of the pair of MEMS optical beam waveguides 652, 662 into the first position is caused by the electric fields that result from the application of the deflection bias voltages to the deflection electrodes 654L/654R and 664L/664R which push or pull the waveguides 652, 662 to the left (or "up" in the figure).

In the event that the optical circuit 657 (or either of the associated first optical waveguides 656, 658) is determined to be defective, the appropriate deflection bias voltages may be applied to the deflection electrodes 654L/654R and 664L/664R to deflect the switched pair of MEMS optical beam waveguides 652, 662 to a second position (indicated with dashed lines) to communicate optical signals to and from a second redundant optical circuit 660 via second optical waveguides 659, 661 associated with the second optical circuit 660. In this way, the multiple deflection electrodes 654-655, 664-665 positioned on and around the switched pair of MEMS optical beam waveguides 652, 662 may be used to deselect a defective optical/circuit element 657 and replace it with a spare or redundant circuit element 660.

FIG. 36 appears to provide a plan view of the optical redundancy switch functionality whereby the pair of optical circuits 657, 660 are located in the same plane and the switched pair of MEMS optical beam waveguides 652, 662 have their cantilevered beams switching side-to-side (e.g., left to right) under the electric field influence of the deflection bias voltages applied to the deflection electrodes 654L/654R and 664L/664R. However, it will be appreciated that the pair of optical circuits 657, 660 may instead be located in different planes of the die 651, in which case the switched pair of MEMS optical beam waveguides 652, 662 may switch their cantilevered beams vertically (e.g., up and down) under the electric field influence of the deflection bias voltages applied to the deflection electrodes 655, 665.

Figure 37:
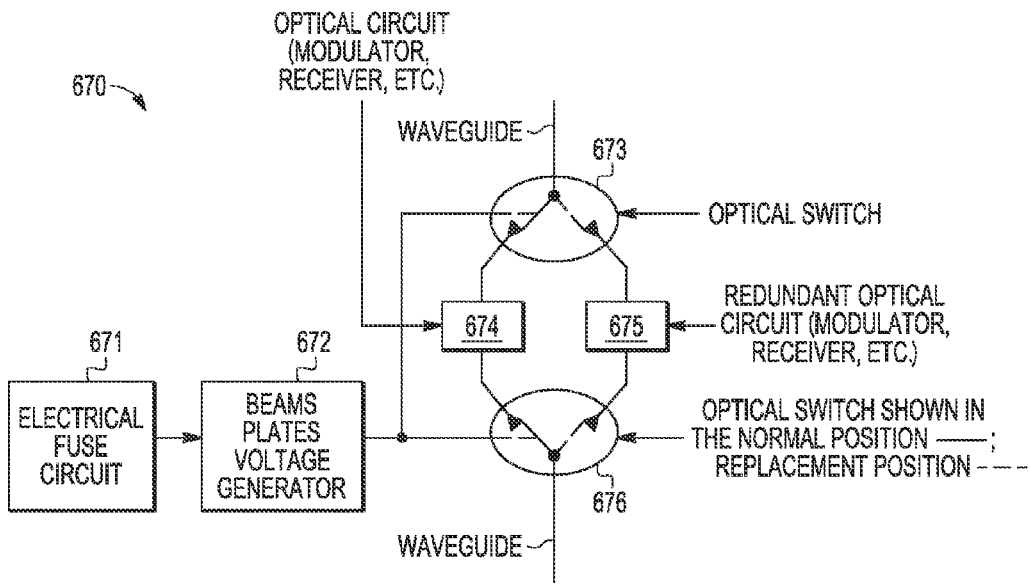
FIG. 37 illustrates an optical redundancy circuit for replacing a defective optical circuit with a redundant optical circuit.

To provide additional details of selected embodiments for implementing optical redundancy switch functionality, reference is now made to FIG. 37 which shows an optical redundancy circuit 670 for replacing a defective optical circuit 674 with a redundant optical circuit 675 by routing optical signals through a pair of optical switches 673, 676 (e.g., double throw MEMS switches) which are placed in series with both the optical circuit 674 and redundant circuit 675. While the optical switches 673, 676 may be implemented as MEMS optical beam waveguides with two-dimensional beam deflection and feedback control, and desired optical switching structure may be used. However implemented, the optical redundancy switch functionality provided by the optical redundancy circuit 670 may be implemented by using fuses to programmably control the switched pair of MEMS optical beam waveguides 652, 662 to deselect a defective optical circuit 657 and replace it with a redundant optical circuit 660. For example one or more electrical fuse circuits 671 may be programmed to generate beam deflection control signals for controlling a beam plate voltage generator 672. In response, the beam plate voltage generator 672 generates and applies one or more bias voltages to deflection plates (not shown) in the optical switches 673, 676 to control their respective switching behavior to switch between first and second switching configurations.

In a first or "normal" switching configuration for the optical redundancy circuit 670 shown in FIG. 37, a first optical switch 673 receives bias voltages which configure the switch 673 into a first switch position (e.g., by switching a cantilevered optical MEMS beam waveguide in the switch 673) for communicating optical signals to an optical waveguide receiving port for a first optical circuit 674, such as a modulator, receiver, etc. In addition, a second optical switch 676 receives bias voltages which configure the switch 676 into a first switch position for receiving optical signals from an optical waveguide transmit port at the first optical circuit 674. As described herein, the first switching configuration for the optical switches 673, 676 may be caused by the electric fields generated from the application of the bias voltages to deflection plates which deflect a MEMS optical beam waveguides as described herein.

The optical redundancy circuit 670 may also be configured in a second or "replacement" switching configuration by providing bias voltages to configure the first optical switch 673 into a second switch position (e.g., by switching a cantilevered MEMS optical beam waveguide in the switch 673) for communicating optical signals to an optical waveguide receiving port for a redundant optical circuit 675, such as a modulator, receiver, etc. In similar fashion, the second optical switch 676 receives bias voltages which configure the switch 676 into a second switch position for receiving optical signals from an optical waveguide transmit port at the redundant optical circuit 675. In the second switching configuration for the optical switches 673, 676, the electric fields generated from the application of the bias voltages to deflection plates deflect the MEMS optical beam waveguides as described herein, causing the switches 673, 676 to switch substitute the redundant optical circuit 675.

Figure 38:
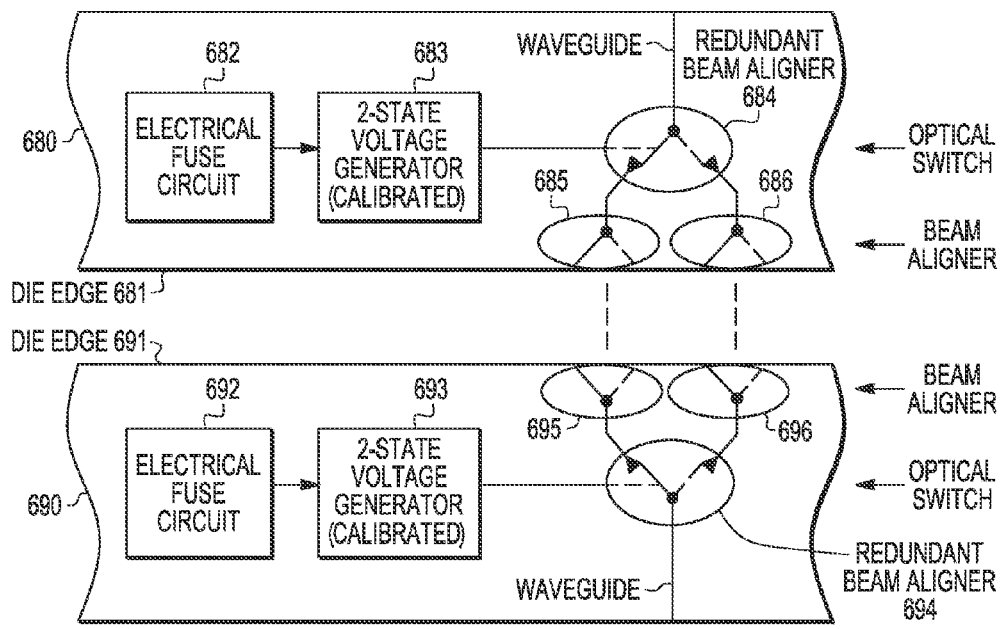
FIG. 38 illustrates a first die edge optical redundancy circuit for replacing a defective optical MEMS beam deflector circuit with a redundant optical MEMS beam deflector circuit.

The disclosed optical redundancy switch functionality may also be used in other embodiments to provide die edge replacement of defective MEMS I/O beam deflector or aligner ports with redundant MEMS I/O beam deflector or aligner ports. When an optical link between two MEMS optical waveguide beams is determined to defective, one or both of the MEMS optical waveguide beams may be defective. Rather than providing testing to determine the exact nature of the link failure, it is more cost effective for both MEMS optical waveguide beams may be replaced. To provide example details of selected die edge replacement embodiments, reference is now made to FIG. 38 which shows two separate die 680, 690 having respective die edges 681, 682 separate from one another by an open air gap. In each die 680, 690, an optical redundancy circuit 682-686, 692-696 provides a replacement die edge MEMS I/O beam deflector for use with one or more normally-used die edge MEMS I/O beam deflectors to form an optical port for each die. In this way, if one of the normally-used die edge MEMS I/O beam deflectors is defective, it may be replaced with the replacement die edge MEMS I/O beam deflector by routing optical signals through an optical switch 684 (e.g., double throw MEMS switches).

For example, the optical redundancy circuit 682-686 in the first die 680 may include an optical switch 684 which is connected to a pair of beam deflectors 685, 686. In selected embodiments, the optical switch 684 and beam deflectors 685, 686 may be implemented as MEMS optical beam waveguides with two-dimensional beam deflection and feedback control substantially as described herein. Upon detecting that one of the beam deflectors (e.g., deflector 685 or deflector 695) is defective, the optical switch 684 switches from a first position to an alternate position to re-route the signal communication path to effectively deselect the defective beam deflector and substitute the replacement die edge MEMS I/O beam deflector (e.g., 686). The control of the optical switch 684 (as well as beam deflectors 685, 686) may be controlled by programming one or more electrical fuse circuits 682 to generate beam deflection control signals for the beam plate voltage generator 683 which supplies one or more bias voltages to deflection plates (not shown) in the optical switch 684 (as well as beam deflectors 685, 686) to control switching behavior. Correspondingly, the optical redundancy circuit 692-696 in the second die 690 may include an optical switch 694 which is connected to a pair of beam deflectors 695, 696 which may be implemented as MEMS optical beam waveguides with two-dimensional beam deflection and feedback control. Upon detecting a defect in one of the MEMS optical beam waveguide deflectors (e.g., deflector 685 or deflector 695), the optical switch 694 switches from a first position to an alternate position to effectively deselect the defective beam deflector and substitute the replacement die edge MEMS I/O beam deflector (e.g., 696). Again, the control of the optical switch 694 (and beam deflectors 695, 696) may be controlled by programming one or more electrical fuse circuits 692 to generate beam deflection control signals for the beam plate voltage generator 693 which supplies bias voltage(s) to deflection plates (not shown) to control switching behavior of the optical switch 694 (as well as beam deflectors 685, 686). In some embodiments. MEMS optical beam waveguide deflectors are replaced in pairs (e.g., 685, 695 or 686, 696) to minimize deflections since it is difficult to detect which MEMS optical beam waveguide of a pair is defective.

Figure 39:
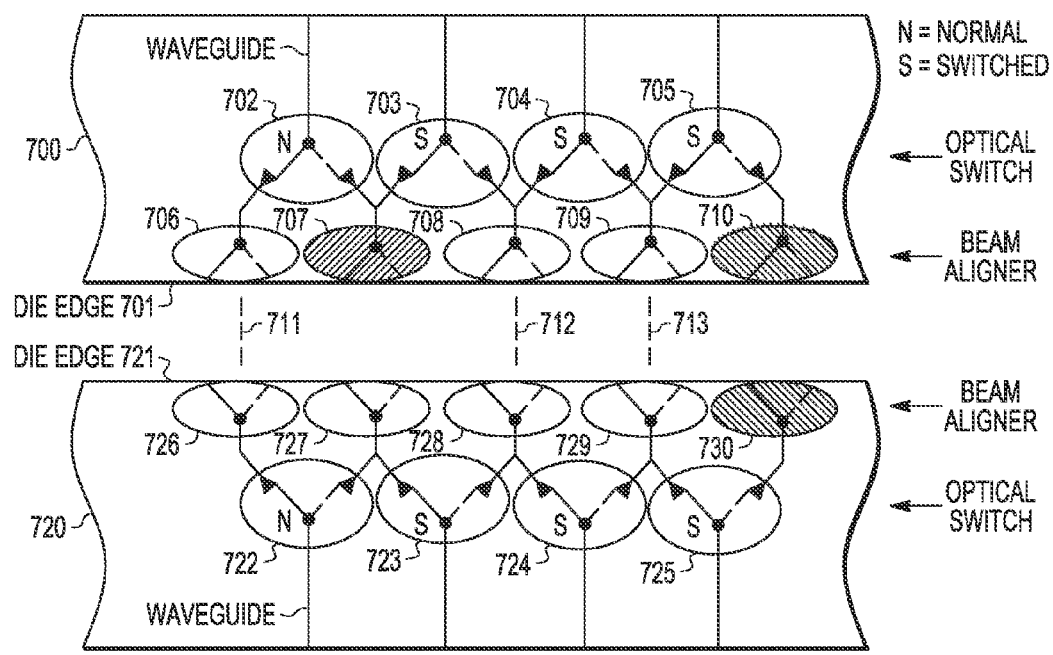
FIG. 39 illustrates a second die edge optical redundancy circuit for shifting around a defective optical MEMS beam deflector circuit with a spare optical MEMS beam deflector circuit.

In yet other replacement embodiments, the disclosed optical redundancy switch functionality may be used to provide die edge replacement to shift a plurality of die edge optical MEMS I/O beam deflector or aligner ports around a defective optical MEMS I/O beam deflector or aligner port by using a spare optical MEMS I/O beam deflector or aligner port on each die. To provide example details of such replacement embodiments, reference is now made to FIG. 39 which shows two separate die 700, 720 having respective die edges 701, 721 separate from one another by an open air gap. In each die 700, 720, an optical redundancy circuit 702-710, 722-730 includes a plurality of optical switches (e.g., double throw MEMS optical beam waveguide switches) and associated plurality of normally-used die edge MEMS I/O beam deflectors 706-709, 726-729 to form an optical port for each die. In normal mode of operation, the plurality of normally-used die edge MEMS I/O beam deflectors 706-709, 726-729 on each die 700, 720 are aligned to transmit and/or receive a plurality of optical signals therebetween. In addition, a replacement die edge MEMS I/O beam deflector 710, 730 is provided at the edge of a plurality of normally-used die edge MEMS I/O beam deflectors to be used to form the optical port for each die if required. With the replacement deflectors 710, 730 in place, if one of the normally-used beam deflectors is defective, all of the optical switches—from the defective beam deflector to the replacement beam deflector—are switched to an alternate position to thereby deselect the defective beam deflector and substitute the replacement beam deflector at the edge of the port. As a result, the beam deflectors 706, 708-710 on the first die 700 and beam deflectors 726, 728-729 on the second die 720 are configured and aligned during a switched mode of operation to transmit and/or receive a plurality of optical signals 711, 712-713 therebetween.

For example, the optical redundancy circuit 702-710 in the first die 710 may include a plurality of optical switches 702-705, each of which is connected to a pair of beam deflectors 706-710 which include a plurality of normally-used beam deflectors 706-709 and a replacement beam deflector 710. In the depicted connection configuration, each optical switch (e.g., 703) is connected in a "normal" configuration to a first beam deflector (e.g., 707) and is connected in a "switched" configuration to a second beam deflector (e.g., 708) which may be adjacent to the first beam deflector. In selected embodiments, the optical switches 702-705 and beam deflectors 706-710 may be implemented as MEMS optical beam waveguides with two-dimensional beam deflection and feedback control substantially as described herein. Correspondingly, the optical redundancy circuit 722-730 in the second die 720 may include a plurality of optical switches 722-725, each of which is connected to a pair of beam deflectors 726-730 which include a plurality of normally-used beam deflectors 726-729 and a replacement beam deflector 730. As illustrated, each optical switch (e.g., 723) is connected in a "normal" configuration to a first beam deflector (e.g., 727) and is connected in a "switched" configuration to a second beam deflector (e.g. 728) which may be adjacent to the first beam deflector. Upon detecting that one of the beam deflectors (e.g., deflector 707) is defective (as indicated with left-to-right crosshatching), the associated optical switch (e.g., 703) and all "downstream" optical switches (e.g., 704-705) in the first die 700 are switched from a first position to an alternate position to re-route the signal communication path, thereby effectively deselecting the defective beam deflector 707 and sequentially substituting the adjacent beam deflectors 708-710. A corresponding reconfiguration of switches in the second die 720 is also made to switch the corresponding optical switch (e.g., 723) and all "downstream" optical switches (e.g., 724-725) from a first position to an alternate position to re-route the signal communication path, thereby effectively deselecting the beam deflector 727 corresponding to the defective beam deflector 707 and sequentially substituting the adjacent beam deflectors 728-730. As a result, the spare beam deflectors 710, 730 (as indicated with left-to-right crosshatching) are used in the switched mode. The corresponding reconfiguration of switches on the second die 720 may be accomplished using any desired technique, such as sending one or more control signals (not shown) to any switch using the defective beam deflector 707 (and to any downstream switches at the second die 720) to provide notification of the changed port pin location. Though not shown, the control of the optical switches 702-705, 722-725 (as well as beam deflectors 706-710, 726-730) may be controlled by supplying bias voltages to the deflection plates in the optical switches and beam deflectors under control of programmed fuse circuits (not shown) to control switching behavior.

Figure 40:
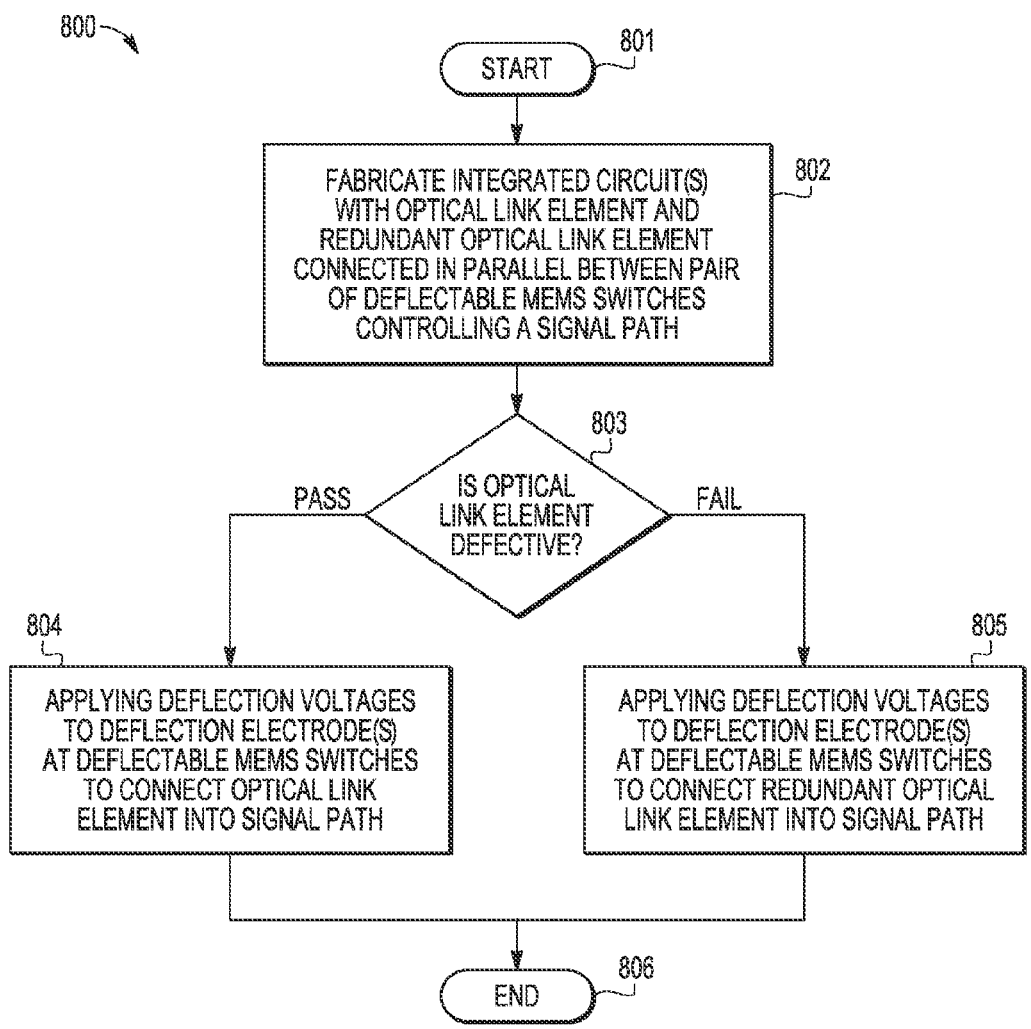
FIG. 40 illustrates a simplified flow chart of a fabrication and operation method for providing optical redundancy in accordance with selected embodiments of the present disclosure.

Turning now to FIG. 40, there is shown a simplified flow chart of a process 800 of a fabrication and operation method for providing optical redundancy in accordance with selected embodiments of the present disclosure. As will be appreciated, the individual steps in the process flow 800 may be performed by a single entity, or by a plurality of different entities. Once the method starts (step 801), one or more integrated circuits are fabricated at step 802 to define a signal path between an optical source and an optical destination or output using one or more optical guiding structures and/or couplers, vertical through-silicon-vias (TSVs), optical feed-throughs (e.g., silicon or oxide waveguides), deflectable MEMS optical waveguide beams, and the like. While the integrated circuit structures (e.g., TSVs, feedthroughs, waveguide beams, etc.) are described with reference to example semiconductor processing steps, it will be appreciated that other semiconductor processing steps may be used to fabricate the integrated circuit structures in other embodiments. In the signal path, an optical link element and a redundant optical link element are connected in parallel between a pair of MEMS switches which are used to control the signal path. In selected example embodiments, the MEMS switches may be formed as deflectable MEMS waveguide beams with two-dimensional beam deflection substantially as described herein.

At step 803, it is determined if the optical link element is defective. This determination may be made in any of a number of different ways, depending on the nature of the application, the manufacturing technology, and the stage at which optical redundancy is provided. For example, predefined functionality criteria may be applied to the optical link element to assess its functionality during manufacture, fabrication, testing, and/or during operation. As will be appreciated, the functionality of each individual optical link element may be measured to detect the desired functionality, or a manufacturer's test report may indicate which optical link elements are either functional or non-functional.

If the optical link element is functional ("pass" outcome from step 803), one or more deflection voltages are applied to deflection electrodes at the deflectable MEMS switches to connect the optical link element into the signal path at step 804. Alternatively, the default position of the deflectable MEMS switches may connect the optical link element into the signal path if no deflection voltages are applied. Once connected into the signal path, the optical link element enables optical energy from the functional optical source to propagate through the signal path to the optical destination or output. However, if the optical link element is not functional ("fail" outcome from step 803), one or more deflection voltages are applied to deflection electrodes at the deflectable MEMS switches to connect the redundant optical link element into the signal path at step 805. Once connected into the signal path, the redundant optical link element enables optical energy from the functional optical source to propagate through the signal path to the optical destination or output. At step 806, the process ends.

By now it should be appreciated that there is provided herein an integrated circuit apparatus which uses deflectable MEMS optical beam waveguides to provide optical redundancy and associated methods of operation and fabrication. The disclosed integrated circuit apparatus includes a first deflectable MEMS switch, a second deflectable MEMS switch, a first integrated circuit link element, and a redundant integrated circuit link element are located in parallel between first and second deflectable MEMS switches which are connected in an optical signal path. As formed, each of the deflectable MEMS optical beam waveguides may include an optical beam structure which is encapsulated by a waveguide beam structure to extend into a deflection cavity and which is surrounded by a plurality of deflection electrodes that are positioned on walls of the deflection cavity to provide two-dimensional deflection control of each deflectable MEMS optical beam waveguide in response to application of one or more deflection voltages. Alternatively, each of the deflectable MEMS switches may include an optical beam structure which is encapsulated by a waveguide beam structure to extend into a deflection cavity and which is surrounded by a plurality of deflection electrodes that are positioned on walls of the deflection cavity to provide two-dimensional deflection control of each deflectable MEMS switch in response to application of one or more deflection voltages. In selected embodiments, the first integrated circuit link element is a first optical link element (e.g., a first optical circuit), and the redundant integrated circuit link element is a redundant optical link element (e.g., a redundant optical circuit) located in parallel between first and second deflectable MEMS optical beam waveguides and formed in a single integrated circuit with the first optical link element. In other embodiments, the first integrated circuit link element is a first optical link formed with a first die edge MEMS I/O beam deflector formed on a first die and a second die edge MEMS I/O beam deflector formed on a second die that is separate from the first die edge by an open air gap, where the first and second die edge MEMS I/O beam deflectors are coupled in the optical signal path during a normal mode. In such embodiments, the redundant integrated circuit link element is a redundant optical link element formed with a first redundant die edge MEMS I/O beam deflector formed on the first die and a second redundant die edge MEMS I/O beam deflector formed on the second die, where the first and second redundant die edge MEMS I/O beam deflectors are coupled in the optical signal path during a replacement mode. In operation, the first and second deflectable MEMS switches are controlled to deselect the first integrated circuit link element and connect the redundant integrated circuit link element in the optical signal path in response to an indication that the first integrated circuit link element is defective. The disclosed integrated circuit apparatus may also include one or more electrical fuse circuits which may be programmed to provide the indication.

In another form, there is provided a method and apparatus for providing redundant circuit protection. As disclosed, a first integrated circuit link element and a redundant integrated circuit link element are provided that are located in parallel between first and second deflectable MEMS switches which are coupled in an optical signal path in response to one or more control signals. In selected embodiments, the integrated circuit link elements are provided as a first optical link element (e.g., first optical circuit) and a redundant optical link element (e.g., redundant optical circuit) that are located in parallel between first and second deflectable MEMS optical beam waveguides which are coupled in the optical signal path in response to one or more control signals. In other embodiments, the first optical link element that is provided includes a first die edge MEMS I/O beam deflector formed on a first die and a second die edge MEMS I/O beam deflector formed on a second die that is separate from the first die edge by an open air gap, where the first and second die edge MEMS I/O beam deflectors are coupled in the optical signal path during a normal mode. In addition, the redundant optical link element that is provided includes a first redundant die edge MEMS I/O beam deflector formed on the first die and a second redundant die edge MEMS I/O beam deflector formed on the second die that is separate from the first die edge by an open air gap, where the first and second redundant die edge MEMS I/O beam deflectors are coupled in the optical signal path during a replacement mode in response to application of the one or more first control signals. During manufacture or operation, one or more tests are applied to detect if the first integrated circuit link element is defective. The detection of a defective integrated circuit element may be performed by applying predefined functionality criteria to assess a functionality measure of the first integrated circuit link element. In addition or in the alternative, the detection of the defective integrated circuit element may include generating one or more first control signals from one or more data values stored in a non-volatile storage circuit, such as a fuse storage circuit. In response to an indication that the first integrated circuit link element is defective, one or more first control signals are applied to the first and second deflectable MEMS switches to disconnect the first integrated circuit link element and to connect the redundant integrated circuit link element in the optical signal path. In selected embodiments, the control signals may be applied to the first and second deflectable MEMS switches by applying a plurality of deflection voltages to a corresponding plurality of deflection electrodes that are positioned on walls of a deflection cavity into which extends first and second deflectable MEMS optical beam waveguides to provide two-dimensional deflection control of each deflectable MEMS optical beam waveguide, thereby disconnecting the first integrated circuit link element and connecting the redundant integrated circuit link element in the optical signal path.

In yet another form, there is provided an integrated circuit apparatus for providing optical beam crossover and a method for manufacturing and operating same. As disclosed, the apparatus includes a first deflectable MEMS optical beam waveguide formed in an optical beam plane to extend into a deflection cavity which is surrounded by a first plurality of deflection electrodes positioned on walls of the deflection cavity to provide two-dimensional deflection control of the first deflectable MEMS optical beam waveguide in response to application of one or more deflection voltages to the first plurality of deflection electrodes. The apparatus also includes a second deflectable MEMS optical beam waveguide formed in the optical beam plane to extend into the deflection cavity for optical communication alignment with the first deflectable MEMS optical beam waveguide, where the deflection cavity is surrounded by a second plurality of deflection electrodes positioned on walls of the deflection cavity to provide two-dimensional deflection control of the second deflectable MEMS optical beam waveguide in response to application of one or more deflection voltages to the second plurality of deflection electrodes. In addition, the apparatus includes an optical link element formed in the optical beam plane to block optical communication between the first and second deflectable MEMS optical beam waveguides when positioned in a first deflection position. Finally, the apparatus includes an optical reflection layer formed outside of the optical beam plane to provide a reflection surface in the deflection cavity for reflecting optical communications between the first and second deflectable MEMS optical beam waveguides when positioned in a second deflection position for reflecting optical communication off the optical reflection layer to cross over the optical link element by applying the one or more deflection voltages to the first and second plurality of deflection electrodes.

In still yet another form, there is provided a method for operating an integrated circuit apparatus to optical beam crossover. As disclosed, there is provided a first deflectable MEMS optical beam waveguide, a second deflectable MEMS optical beam waveguide, and an optical link element. The first and second first deflectable MEMS optical beam waveguides and optical link elements are formed in an optical beam plane to extend into a deflection cavity such that the optical link element blocks optical signaling between the first and second deflectable MEMS optical beam waveguides when positioned in a first deflection position. By applying one or more deflection voltages to a plurality of deflection electrodes positioned on walls of the deflection cavity and surrounding the first and second deflectable MEMS optical beam waveguides, the first and second deflectable MEMS optical beam waveguides are deflected into a second deflection position for reflecting optical signaling off an optical reflection layer formed outside of the optical beam plane to provide reflected optical signal path between the first and second deflectable MEMS optical beam waveguides that crosses over the optical link element.

Although the described exemplary embodiments disclosed herein are directed to various high density, low power, high performance information systems with integrated optical communications using deflectable MEMS optical beam waveguides with two-dimensional alignment and controlled feedback to provide optical redundancy and methods for making same, the present invention is not necessarily limited to the example embodiments which illustrate inventive aspects of the present invention that are applicable to a wide variety of fabrication processes and/or structures. Thus, the particular embodiments disclosed above are illustrative only and should not be taken as limitations upon the present invention, as the invention may be modified and practiced in different but equivalent manners apparent to those skilled in the art having the benefit of the teachings herein. For example, while the optical redundancy features are described with example semiconductor process details for implementing various processor and memory die stack embodiments, this is merely for convenience of explanation and not intended to be limiting and persons of skill in the art will understand that the principles taught herein apply to other semiconductor processing steps and/or different types of integrated circuit devices. As a result, the various references to a processor die will be understood by those skilled in the art to refer to any processor, microprocessor, microcontroller, digital signal processor, audio processor, or other defined logic circuit and any combination thereof. Likewise, the various references to a memory die will be understood by those skilled in the art to refer to any memory die, such as DRAM, Flash. SRAM, MRAM, or other defined memory circuit and any combination thereof, and may also refer to a memory controller. Moreover, the thicknesses, materials, and processing details for the described layers may deviate from the disclosed examples. In addition, the terms of relative position used in the description and the claims, if any, are interchangeable under appropriate circumstances such that embodiments of the invention described herein are, for example, capable of operation in other orientations than those illustrated or otherwise described herein. The term "coupled," as used herein, is defined as directly or indirectly connected in an electrical or non-electrical manner. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising:
   a first deflectable MEMS switch comprising a first deflectable optical beam waveguide that is deflectable under a first electric field influence;
   a second deflectable MEMS switch comprising a second deflectable optical beam waveguide that is deflectable under a second electric field influence; and a first optical link element and a redundant optical link element located in parallel between the first and second deflectable MEMS switches which are controlled to deselect the first optical link element and connect the redundant optical link element in an optical signal path in response to an indication that the first optical link element is defective.

2. The apparatus of claim 1, where the first optical link element and redundant optical link element comprise, respectively, a first optical circuit and a redundant optical circuit formed in a single integrated circuit.

3. The apparatus of claim 1, where the first optical link element comprises a first die edge MEMS I/O beam deflector formed on a first die and a second die edge MEMS I/O beam deflector formed on a second die that is separate from the first die edge by an open air gap, where the first and second die edge MEMS I/O beam deflectors are coupled in the signal path during a normal mode.

4. The apparatus of claim 3, where the redundant optical link element comprises a first redundant die edge MEMS I/O beam deflector formed on the first die and a second redundant die edge MEMS I/O beam deflector formed on the second die, where the first and second redundant die edge MEMS I/O beam deflectors are coupled in the signal path during a replacement mode.

5. The apparatus of claim 1, further comprising one or more electrical fuse circuits which may be programmed to provide the indication.

6. The apparatus of claim 1, where each of the first and second deflectable MEMS optical beam waveguides are each formed with an optical beam structure which is encapsulated by a waveguide beam structure to extend into a deflection cavity and which is surrounded by a plurality of deflection electrodes that are positioned to provide two-dimensional deflection control of each deflectable MEMS optical beam waveguide in response to application of one or more deflection voltages.

7. The apparatus of claim 1, where each of the first and second deflectable MEMS switches comprises an optical beam structure which is encapsulated by a waveguide beam structure and a plurality of deflection electrodes positioned to provide two-dimensional deflection control of each deflectable MEMS switch in response to application of one or more deflection voltages in response to the indication.

8. The apparatus of claim 1, where the first optical link element comprises a first die edge MEMS I/O beam deflector formed on a first die and a second die edge MEMS I/O beam deflector formed on a second die that is separate from the first die edge by an open air gap, where the first and second die edge MEMS I/O beam deflectors are coupled in the signal path during a normal mode.

9. A method comprising:
providing a first optical link element and a redundant optical link element located in parallel between first and second deflectable MEMS switches which are coupled in an optical signal path in response to one or more control signals, where the first and second deflectable MEMS switches comprise, respectively, first and second deflectable MEMS optical beam waveguides, each of which are deflectable under a separate electric field influence; and
applying one or more first control signals to the first and second deflectable MEMS switches to disconnect the first optical link element and to connect the redundant optical link element in the optical signal path in response to an indication that the first optical link element is defective.

10. The method of claim 9, where the first optical link element and redundant optical link element comprise, respectively, a first optical circuit and a redundant optical circuit formed in a single integrated circuit.

11. The method of claim 9, where providing the first optical link element comprises providing a first die edge MEMS I/O beam deflector formed on a first die and a second die edge MEMS I/O beam deflector formed on a second die that is separate from the first die edge by an open air gap, where the first and second die edge MEMS I/O beam deflectors are coupled in the optical signal path during a normal mode.

12. The method of claim 11, where providing the redundant optical link element comprises providing a first redundant die edge MEMS I/O beam deflector formed on the first die and a second redundant die edge MEMS I/O beam deflector formed on the second die that is separate from the first die edge by an open air gap, where the first and second redundant die edge MEMS I/O beam deflectors are coupled in the optical signal path during a replacement mode in response to application of the one or more first control signals.

13. The method of claim 9, where the first optical link element is determined to be defective by applying predefined functionality criteria to assess a functionality measure of the first optical link element.

14. The method of claim 9, where the first optical link element is determined to be defective by generating the one or more first control signals from one or more data values stored in a non-volatile storage circuit.

15. The method of claim 9, where applying one or more first control signals to the first and second deflectable MEMS switches comprises applying a plurality of deflection voltages to a first plurality of deflection electrodes positioned around a first deflectable MEMS optical beam waveguide and to a second plurality of deflection electrodes positioned around second deflectable MEMS optical beam waveguide to provide two-dimensional deflection control of each deflectable MEMS optical beam waveguide, thereby disconnecting the first optical link element and connecting the redundant optical link element in the optical signal path.

16. An apparatus comprising:
a first deflectable MEMS optical beam waveguide formed in an optical beam plane to extend into a deflection cavity with a first plurality of deflection electrodes positioned to provide two-dimensional deflection control of the first deflectable MEMS optical beam waveguide in response to application of one or more deflection voltages to the first plurality of deflection electrodes;
a second deflectable MEMS optical beam waveguide formed in the optical beam plane for optical communication alignment with the first deflectable MEMS optical beam waveguide with a second plurality of deflection electrodes positioned to provide two-dimensional deflection control of the second deflectable MEMS optical beam waveguide in response to application of one or more deflection voltages to the second plurality of deflection electrodes;
an optical link element formed in the optical beam plane to block optical communication between the first and second deflectable MEMS optical beam waveguides when positioned in a first deflection position; and
an optical reflection layer formed outside of the optical beam plane to provide a reflection surface in the deflection cavity for reflecting optical communications between the first and second deflectable MEMS optical beam waveguides when positioned in a second deflection position for reflecting optical communication off the optical reflection layer to cross over the optical link element by applying the one or more deflection voltages to the first and second plurality of deflection electrodes.

* * * * *